United States Patent [19]
Pullen et al.

[11] Patent Number: 5,923,376
[45] Date of Patent: Jul. 13, 1999

[54] METHOD AND SYSTEM FOR THE FRACTAL COMPRESSION OF DATA USING AN INTEGRATED CIRCUIT FOR DISCRETE COSINE TRANSFORM COMPRESSION/ DECOMPRESSION

[75] Inventors: David Michael Pullen, Dunwoody; Bradley Thomas Howard, Norcross, both of Ga.

[73] Assignee: Iterated Systems, Inc., Atlanta, Ga.

[21] Appl. No.: 09/177,235

[22] Filed: Oct. 22, 1998

Related U.S. Application Data

[63] Continuation-in-part of application No. 08/623,997, Mar. 29, 1996., Pat. No. 5,867,221

[51] Int. Cl.$^6$ ............................. H04N 7/50; H04N 7/30; H04N 7/28
[52] U.S. Cl. .................. 348/417; 348/413; 348/414; 348/416
[58] Field of Search ................................. 348/699, 413, 348/414, 416, 417, 418, 422

[56] References Cited

U.S. PATENT DOCUMENTS

| | | | |
|---|---|---|---|
| 4,941,193 | 7/1990 | Barnsley | 382/249 |
| 5,105,271 | 4/1992 | Niihara | 348/699 |
| 5,214,504 | 5/1993 | Toriu | 348/407 |
| 5,432,556 | 7/1995 | Hatano | 348/390 |
| 5,457,495 | 10/1995 | Hartung | 348/418 |
| 5,477,272 | 12/1995 | Zhang | 348/407 |
| 5,576,772 | 11/1996 | Kondo | 348/416 |

*Primary Examiner*—Howard Britton
*Attorney, Agent, or Firm*—Morris, Manning & Martin, LLP

[57] ABSTRACT

A method for compressing related data sets of a sequence is disclosed. The method compares domain blocks from a current frame buffer to range blocks in a previous frame buffer or vector quantization ("VQ") tables to generate codes. The method includes determining an initial codeword that represents a domain block of a current frame buffer in reference to a selected range block in a previous frame buffer. The selected range block is identified by a best measurement determined from an initial type of search performed on a first group of range blocks in the previous frame buffer. A cost factor is generated for coding the initial codeword. A first estimated cost of a codeword representing the domain block in reference to a second range block is determined. The second range block is identified by an estimated best measurement determined for a second type of search performed on a second group of range blocks. The first estimated cost is compared to initial codeword cost and a second type of search is performed in response to the first estimated cost being less than the initial codeword cost. A second codeword is generated that represents the domain block in reference to a second range block that corresponds to an actual best measurement determined by the second type of search and the cost of coding the second codeword is determined. The codeword having the least cost between the initial codeword and the second codeword is selected for representing the domain block.

20 Claims, 13 Drawing Sheets

| 1 | 4 | 7 | 10 | 13 | 16 | 19 | 22 | 25 | 28 | 31 |
|---|---|---|---|---|---|---|---|---|---|---|
| 34 | 37 | 40 | 43 | 46 | 49 | 52 | 55 | 58 | 61 | 64 |
| 67 | 70 | 73 | 76 | 79 | 82 | 85 | 88 | 91 | 94 | 97 |
| 100 | 103 | 105 | 109 | 112 | 115 | 118 | 121 | 124 | 127 | 130 |
| 133 | 136 | 139 | 142 | 145 | 148 | 151 | 154 | 157 | 160 | 163 |
| 166 | 169 | 172 | 175 | 178 | 181 | 184 | 187 | 190 | 193 | 196 |
| 199 | 202 | 205 | 208 | 211 | 214 | 217 | 220 | 223 | 226 | 229 |
| 232 | 235 | 238 | 241 | 244 | 247 | 250 | 253 | 256 | 259 | 262 |
| 265 | 268 | 271 | 274 | 277 | 280 | 283 | 286 | 289 | 292 | 295 |

Y

| 2 | 5 | 8 | 11 | 14 | 17 | 20 | 23 | 26 | 29 | 32 |
|---|---|---|---|---|---|---|---|---|---|---|
| 35 | 38 | 41 | 44 | 47 | 50 | 53 | 56 | 59 | 62 | 65 |
| 68 | 71 | 74 | 77 | 80 | 83 | 86 | 89 | 92 | 95 | 98 |
| 101 | 104 | 107 | 110 | 113 | 116 | 119 | 122 | 125 | 128 | 131 |
| 134 | 137 | 140 | 143 | 146 | 149 | 152 | 155 | 158 | 161 | 164 |
| 167 | 170 | 173 | 176 | 179 | 182 | 185 | 188 | 191 | 194 | 197 |
| 200 | 203 | 206 | 209 | 212 | 215 | 218 | 221 | 224 | 227 | 230 |
| 233 | 236 | 239 | 242 | 245 | 248 | 251 | 254 | 257 | 260 | 263 |
| 266 | 269 | 272 | 275 | 278 | 281 | 284 | 287 | 290 | 293 | 296 |

| 3 | 6 | 9 | 12 | 15 | 18 | 21 | 24 | 27 | 30 | 33 |
|---|---|---|---|---|---|---|---|---|---|---|
| 36 | 39 | 42 | 45 | 48 | 51 | 54 | 57 | 60 | 63 | 66 |
| 69 | 72 | 75 | 78 | 81 | 84 | 87 | 90 | 93 | 96 | 99 |
| 102 | 105 | 108 | 111 | 114 | 117 | 120 | 123 | 126 | 129 | 132 |
| 135 | 138 | 141 | 144 | 147 | 150 | 153 | 156 | 159 | 162 | 165 |
| 168 | 171 | 174 | 177 | 180 | 183 | 186 | 189 | 192 | 195 | 198 |
| 201 | 204 | 207 | 210 | 213 | 216 | 219 | 222 | 225 | 228 | 231 |
| 234 | 237 | 240 | 243 | 246 | 249 | 252 | 255 | 258 | 261 | 264 |
| 267 | 270 | 273 | 276 | 279 | 282 | 285 | 288 | 291 | 294 | 297 |

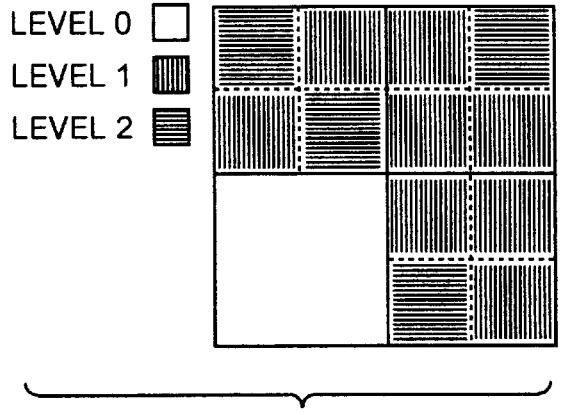

FIG.12      FIG.13

SORTED BY BLOCK:
CODEWORD FOR TOPMOST LEVEL, I.E. LEVEL 0      (SHAPE = 13)
    CODEWORD FOR CHILD 0 AT LEVEL 1      (SHAPE = 9)
        CODEWORD FOR CHILD 0 AT LEVEL 2      (SHAPE = 0)
        CODEWORD FOR CHILD 3 AT LEVEL 2      (SHAPE = 0)
    CODEWORD FOR CHILD 2 AT LEVEL 1      (SHAPE = 4)
        CODEWORD FOR CHILD 2 AT LEVEL 2      (SHAPE = 0)
    CODEWORD FOR CHILD 3 AT LEVEL 1      (SHAPE = 2)
        CODEWORD FOR CHILD 1 AT LEVEL 2      (SHAPE = 0)

FIG.14A

SORTED BY LEVEL:
CODEWORD FOR TOPMOST LEVEL, I.E. LEVEL 0      (SHAPE = 13)
CODEWORD FOR CHILD 0 AT LEVEL 1      (SHAPE = 9)
CODEWORD FOR CHILD 2 AT LEVEL 1      (SHAPE = 4)
CODEWORD FOR CHILD 3 AT LEVEL 2      (SHAPE = 2)
CODEWORD FOR CHILD 0 AT LEVEL 2      (SHAPE = 0)
CODEWORD FOR CHILD 2 AT LEVEL 2      (SHAPE = 0)
CODEWORD FOR CHILD 3 AT LEVEL 2      (SHAPE = 0)
CODEWORD FOR CHILD 1 AT LEVEL 2      (SHAPE = 0)

FIG.14B

| COLOR | LEVEL | TYPE | SHAPE | X | Y | Q |
|---|---|---|---|---|---|---|

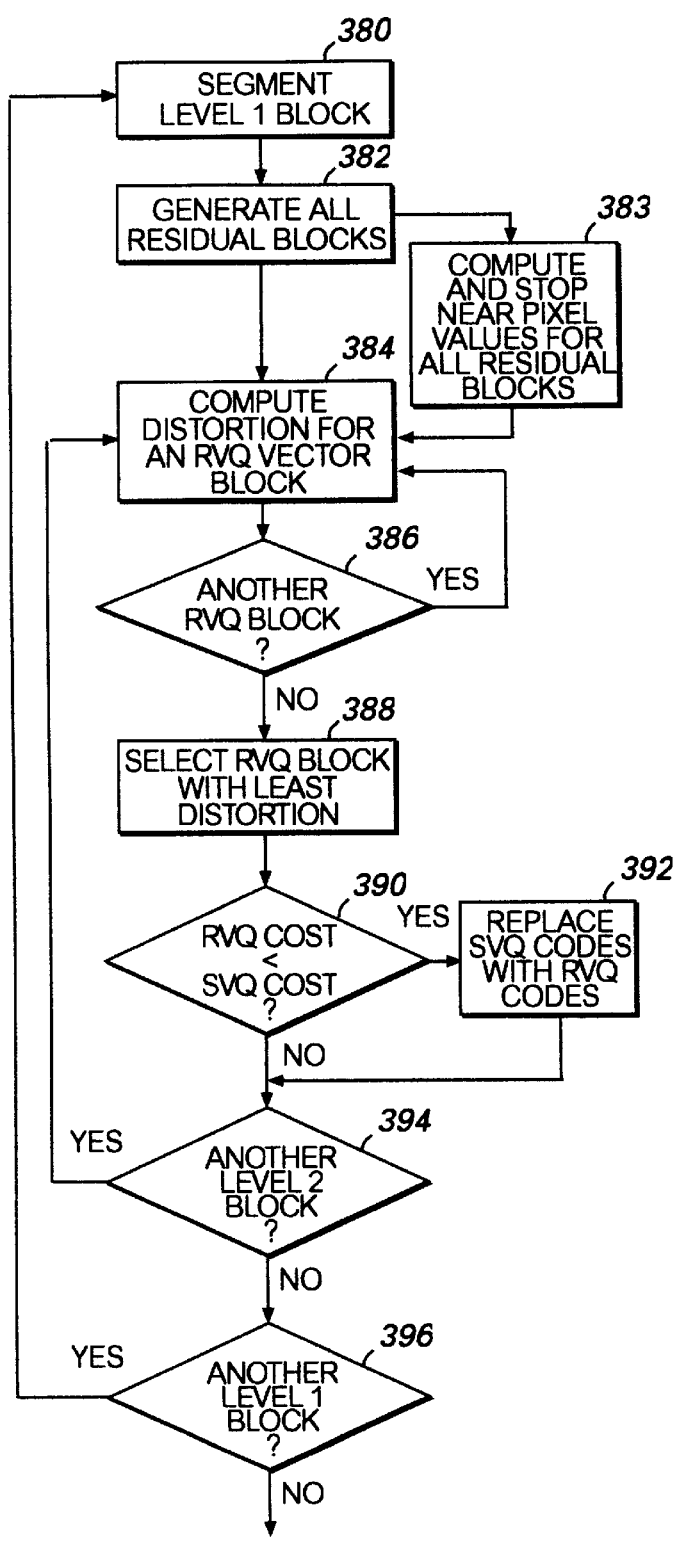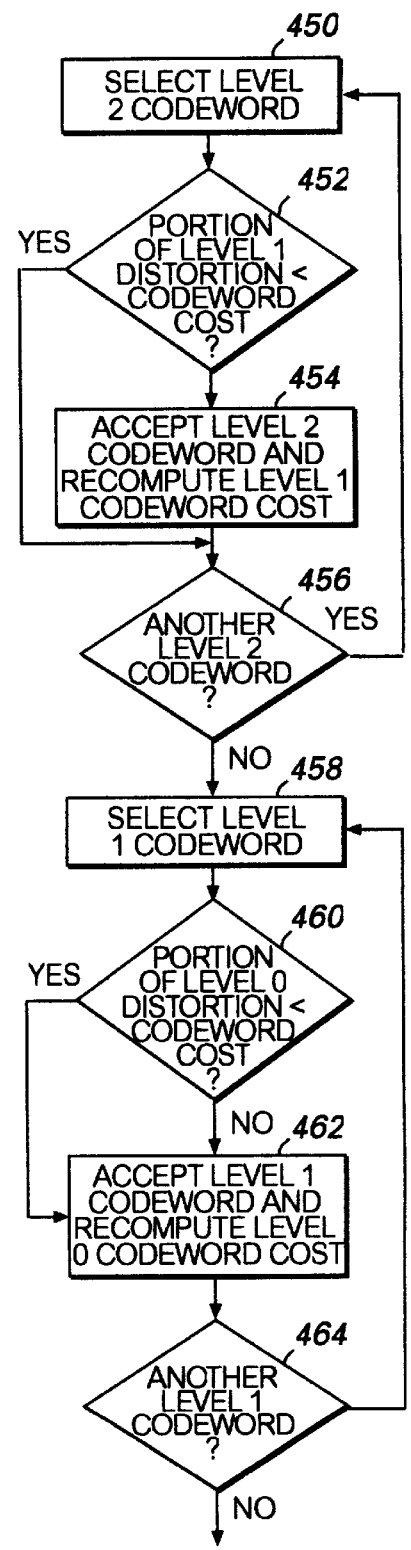
FIG. 20          FIG. 21

METHOD AND SYSTEM FOR THE FRACTAL COMPRESSION OF DATA USING AN INTEGRATED CIRCUIT FOR DISCRETE COSINE TRANSFORM COMPRESSION/ DECOMPRESSION

This application is a continuation-in-part of and claims benefit of U.S. application Ser. No. 08/623,997 filed Mar. 29, 1996, now U.S. Pat. No. 5,867,221.

BACKGROUND FIELD OF THE INVENTION

This invention relates to data compression, and more particularly, to the compression of data using single instruction, multiple data processors.

BACKGROUND OF THE INVENTION

Data compression is an important aspect of data communication. As digital data proliferates, the size of the data sets being communicated are increasing. The communication conduits over which this data is transmitted have a limiting bandwidth which slows the time for the transmission of the entire data set to a remote site. Data compression methods have been developed which reduce the size of the data set prior to its transmission and permit the regeneration of the data set at the remote site which receives the compressed data set. When the regeneration of the data set results in no loss of data, the compression method is called lossless compression. When the regenerated data set represents the original data set but does not reproduce it exactly, the compression method is called lossy. Lossy compression methods are especially useful in image transmissions since the human eye is tolerant of some loss of image data.

Many lossy compression methods have been developed. Among these are discrete cosine transform ("DCT") methods, wavelet methods, and fractal methods. Even among these broad descriptions of lossy compression methods, there are variants for each method. In an effort to standardize a lossy compression method to encourage development of compatible products and processes, the Joint Photographic Experts Group ("JPEG") adopted a baseline DCT-based compression method as a standard for image data compression. For similar reasons, the Moving Pictures Expert Group ("MPEG") also developed a DCT-based standard for the compression of image data in frames of a video sequence. The adoption of the standard determines a number of operating parameters for the DCT compression of image data which may be implemented in image compressor/ decompressor products. Consequently, the products have some degree of uniformity so they are compatible with one another. Companies generally view development of DCT-based products and processes as being less risky because the standard creates a market of customers who desire the product compatibility provided by the standard.

Compression methods may be implemented by a general purpose computer executing instructions stored in memory to generate a compressed representation of a data set usually stored in a working memory. This implementation has the advantage of being flexible since the program operating the general purpose computer may be more easily modified than a program stored within a read-only memory ("ROM") or the like. While this type of system is more flexible, it suffers from speed limitations when compared to dedicated hardware systems such as those implemented in integrated circuits ("IC"). Integrated circuits may be developed for particular applications, including data compression/ decompression. These dedicated ICs usually include specialized processors and supporting components which are adapted to a particular application. By so designing an IC, the time required to process data for the specialized application is often greatly reduced.

The cost for designing and fabricating an IC may be quite expensive. Typically, thousands of hours are required to design the specialized circuitry for the IC and the cost for preparing a manufacturing line to build the package containing the IC involves substantial capital cost. Thus, the advantages to be gained from specialized circuitry implemented in an IC must be balanced against the cost of designing, fabricating and manufacturing the IC. Because the cost and time for bringing an IC to market is significant, IC manufacturers tend to be risk averse. Consequently, the development of specialized ICs which implement lossy data compression methods have tended to implement DCT-based methods, almost to the exclusion of other methods.

While DCT-based methods have gained an advantage in speed of method implementation through specialized ICs, the advantage has not been so great as to preclude further development of the fractal and wavelet methods. Because the DCT method is restricted to certain block sizes and constraints on cosine coefficients, the method has problems with resolution independent applications, blocking artifacts, and relatively low compression rates. One improved fractal encoding method for video sequences is disclosed in a co-pending patent application entitled System and Method For Representing A Video Sequence having Ser. No. 08/586, 341 pending Jan. 29, 1999 which is co-owned by the assignee of the present application. That method uses a variable block size approach coupled with a mean corrected comparison scheme and codeword bit cost evaluation to compress image data sets more efficiently than DCT-based methods and remain within the bandwidth of a communication conduit for the transmission of video frames. That method is preferably implemented on a single general processor with a standard bus and interface connections to memory and input/output ("I/O") devices. While the system and method of that application are effective for off-line compression of high frame rates and real time applications for lower frame rates, there is a need for implementing that improved method for video sequences in real time at higher frame rates. However, the cost and time for development of a dedicated processor to implement that method for such an application appears to be cost prohibitive at this time. What is needed is a system and method which utilizes the speed of a DCT processor for implementing other encoding methods.

Additionally, the method and system discussed in the above referenced application can be computationally intense because the domain blocks at each size level are exhaustively searched through a range area to find a range block which best corresponds to a domain block. Conducting exhaustive searches at each level may require such a number of computations that the codewords are not generated quickly enough to support the rate of frame generation necessary for timely transmission of the compressed frames of a video sequence. What is needed is an encoding method and system which reduces the number of searches required to compress a data set.

SUMMARY OF THE INVENTION

The above-limitations of previously known fractal methods and DCT processors are overcome by a system and method implemented in accordance with the principles of the present invention. That method includes the steps of determining a best block correspondence between a domain block of a frame buffer and one of a block in a previous frame buffer and a vector quantization block and determining a set of codes which correspond to the determined best block correspondence. This method may be implemented in a system of the present invention which uses a DCT processor to determine the best block correspondence.

The preferred application of the present invention is for compressing frames of a video sequence, although the system and method may be used to lossy compress any set of related data sets. For video frames, the system preferably uses a DCT processor which scales and filters an image to a QCIF size of 176×144 pixels, although other image sizes may be supported. Preferably, the image to be compressed is a chrominance/luminance space ("YUV") image. The Y component is preferably 176×144 pixels and the U and V components "second color components") are preferably 88×72 pixels. This sizing of the Y, U, and V components comports with well known techniques which reduce the size, and correspondingly, the processing time, of the U and V components. This reduction in size does not significantly degrade image quality since most of the detail discernible to the human eye is contained in the Y component.

The method segments the Y component into domain blocks of a first size and the U and V components into domain blocks which are preferably one quarter of the Y component domain block size. Preferably, a domain block of the Y component is processed first, followed by the processing of the corresponding domain blocks in the U and V components. The processing of a domain block in the Y component begins with a no-motion search by determining the distortion between the domain block and the corresponding block in the previous frame. A cost, described in more detail below, is computed for the codeword that represents the use of the corresponding block to describe the domain block. The processing continues by performing a local search, if the cost calculated for the no-motion block is greater than an estimated cost for a local search. The local search compares the domain block to a plurality of range blocks in a range area of the previous frame buffer and selects a domain block/range block combination corresponding to the smallest distortion measurement between the domain and range blocks. This domain block/range block combination may be represented by a set of codes which, preferably, include a shape, motion vector and q parameter. These codes may in turn be losslessly compressed using an entropy encoder. The cost of the codes, as used in this application, is the sum of the distortion measurement for a best correspondence multiplied by a normalization factor and the length in bits of the codeword generated by the entropy encoder multiplied by a bit rate factor. This cost may be used to evaluate whether the distortion measurement obtained by including the codes represented by the codeword are worth the bit cost of the codewords in the output stream. The process continues by comparing the cost of the local search and the cost of the no-motion search. The codeword having the lowest cost is selected.

The selected cost is then compared to an estimated cost for a checkerboard search, and the checkerboard search is performed if its estimated cost is less than the selected cost. If the checkerboard search is performed, the process continues by defining a larger range area in the previous frame buffer and performing a checkerboard search of the range blocks in this larger area. Preferably, the origins of these range blocks are located on every other row and column of the range area. If the range area is larger than a working area for a data comparator, as it is in the preferred embodiment, the range area is searched in multiple passes each of which processes a portion of the range area at a time. The cost of representing the domain block in terms of the range block having the smallest distortion measurement of a pass is compared to the selected cost. After the checkerboard search is concluded, the codeword corresponding to the least cost between the no-motion, local search and checkerboard search is selected.

Additional searching is performed by segmenting the domain block of the Y component into a plurality of domain child blocks. The difference between each pixel of a domain child block and each pixel of a corresponding block (i.e., the block corresponds to the quadrant of the previously selected lowest cost codeword) in a corresponding range child block is computed and the absolute values of all of the differences are summed to determine a domain child block error. For each child block, a mean pixel difference value between the domain child block and a corresponding range child block is also computed. The cost of the code to represent each domain child block with the mean difference value and no-motion vector is computed and stored. A domain child block search is performed if an estimated cost for each search is less than the corresponding domain child block error. If a domain child block search is to be performed, a corresponding range child area for each domain child block is then selected. One of the domain child blocks is selected and compared to each range child block within the range child area to determine a distortion measurement for each domain child block/range child block combination. The motion vector corresponding to the domain child block/range child block combination having the lowest distortion measurement is stored. The cost for the corresponding domain child block mean pixel difference codeword and the domain child block motion vector codeword are compared and the least cost is used to determine the best correspondence for the domain child block.

The determination of the best correspondence for the domain block in the Y component being processed continues by segmenting each domain child block into a plurality of domain child sub-blocks and computing a distortion measurement between each domain child sub-block and its corresponding range child sub-block. This distortion measurement is preferably the sum of the absolute values of the differences between the pixels of a domain child sub-block and the pixels in a corresponding range child sub-block, and is called domain child sub-block error. Then for each domain child sub-block, the mean pixel value (q parameter) is computed and subtracted from each pixel in the domain child sub-block. Each domain child sub-block of a selected domain child block is compared to stand-alone vector quantization (SVQ) blocks stored in an SVQ table and a distortion measurement for each comparison is computed. The domain child sub-block/SVQ block comparison which yields the smallest distortion measurement is selected as best representing the domain child sub-block. The SVQ block has a corresponding vector identifier. Once a vector identifier and a q parameter have been selected for each domain child sub-block, the cost of the codeword which represents the vector identifier and q parameter is computed.

An estimated residual search cost is then computed for each domain child sub-block. The estimated residual search cost is compared to the domain child sub-block error to determine whether a residual search is performed for the domain child sub-block. If the estimated cost is less than the domain child sub-block error, a residual search for the domain child sub-block is performed. In a residual search, each domain child sub-block of a selected domain child block is subtracted from a range child sub-block (corresponding to the selected domain child block codeword). The q parameter of the resulting difference block is then computed and this mean is subtracted from each pixel value in the difference block. A distortion measurement is then computed between the mean-stripped difference block and each residual vector block in a residual vector quantization (RVQ) table. The RVQ block in the table that corresponds to the smallest distortion measurement is selected as best representing the difference block. The cost for the codeword corresponding to the selected RVQ vector and mean is compared to the cost for the codeword corresponding to the selected SVQ vector and mean. The lowest cost codeword identifies the vector type, vector identifier, and corresponding mean value that best represents the domain child sub-block. If the cost of the codeword is less than the domain child sub-block error, the codeword for the domain child sub-block is added to the set of codes which represent the domain child block and the cost of the codeword for the domain child block is adjusted to reflect the inclusion of the domain child sub-block codeword. If all of the codewords for the domain child sub-blocks are selected, and are all SVQ, then the set of codes which represent the domain child block is replaced by a minimum length codeword and the cost is adjusted. At the next higher level, the cost of the set of codes for each domain child block and selected domain child sub-blocks is then compared to the domain child block error. If the cost is less than the domain child block error, the codewords for the domain child block and retained domain child sub-blocks are retained to represent the domain block and the domain block cost is likewise adjusted. Otherwise, they are removed from the set of codes which represent the domain block. If all of the codewords for the domain child blocks are retained, then the codeword for the domain block is removed from the set of codes which represent the domain block.

The corresponding domain block of one of the U and V components is then processed. A distortion measurement is computed between a domain block in the U or V component and its corresponding no-motion block in the previous frame buffer. Then the motion vector determined for the best correspondence between the domain block and a range block of the Y component is adjusted for the smaller size of the U and V components. Preferably, this adjustment is the division of the motion vector for the Y component domain block by 2, which is performed by shifting the X and Y components of the motion vector right one bit position. The range block corresponding to the origin identified by this adjusted motion vector is then compared to the U or V component domain block and a distortion measurement determined. If this distortion measurement is less than or equal to a predetermined threshold, no further searching is performed for this U or V domain block. If the distortion measurement exceeds a predetermined error threshold, the domain block of the U or V component being processed is segmented into a plurality of domain child blocks. Before a domain child block is further processed for the U and V components, the distortion measurement between the domain child block and the range child block corresponding to the adjusted motion vector is compared to a second error threshold. If it is greater than or equal to the threshold, no further processing of the domain child block is performed. Otherwise, the mean value for each domain child block is then computed and removed from each domain child block. Each mean stripped block is compared to the blocks of an SVQ table for the corresponding color component and the SVQ block yielding the lowest distortion measurement is selected. The cost of the codeword representing the SVQ block identifier and q parameter for each domain child block is computed and compared to the distortion measurement for the portion of the domain block which corresponds to the domain child block. If the cost for the domain child block is less than the domain child block error, the codes for the domain child block are included in the set of codes for the domain block. Since the U and V components are one quarter the size of the Y component, the domain child blocks for the U and V components are the same size as the domain child sub-block for the Y component and consequently, searching for a best correspondence is terminated at this level.

The cost of the codes retained to represent the domain blocks of Y, U, and V components are compared to the cost of a do-nothing code. A do-nothing code may be represented with a single bit. Thus, this comparison determines whether the codes which represent a domain block and the segments thereof with reduced error are "cheaper" than the cost of simply reusing the no-motion range blocks in the Y, U, and V components with their attendant error. The selected code or codes are then preferably encoded using an entropy encoder and transmitted as a compressed representation of the domain block.

Processing for the next domain block in the Y component, followed by processing of the U and V components, continues until all of the domain blocks in the Y, U and V components are processed. At this point, all of the codewords necessary to represent the frame have been generated, encoded and transmitted to a remote site. To generate the previous frame to be used to compress the next frame, a decompressor at the compressor site is used to decompress the set of codes so the compressor is using the same data set to compress the next frame that the decompressor at the receiver site is using to decompress compressed frames. The process may then continue by loading a new frame of video data for processing or, if no frame is detected, terminating the process.

In a preferred embodiment of the present invention, the cost for a codeword is the sum of a normalized distortion measurement and the length of the codeword being evaluated adjusted by a factor $\lambda$, where $\lambda$ is a LaGrangian multiplier. Most preferably, the distortion normalization factor is a power of 2 so that multiplication of the distortion measurement may be achieved by shifting the distortion measurement to the left. The total number of bits which may be used to represent the codes for a frame has a predetermined upper limit which corresponds to the maximum number of bits which may be transmitted within a unit of time and remain within the transmission rate of the communication conduit. If the number of bits used for the codeword increases at a rate which would exceed this upper bound prior to all of the domain blocks for a frame being processed, then the LaGrangian multiplier is increased so that smaller code words are generated for the codes representing later domain blocks. If the number of bits for codewords being generated for domain blocks lag behind a predetermined rate for codeword generation, then the LaGrangian multiplier may be decreased to take advantage of the excess capacity for codeword size to increase the detail contained in the compressed image.

At the receiver site, codewords which represent the codes are decoded. The decoded codes identify blocks within a regenerated frame buffer or SVQ/RVQ tables via motion vectors, or vector types and identifiers, and q values, or both, which are to be applied to the pixels of the identified blocks. The motion vectors are used to move pixels of the identified blocks in the regenerated frame into a current frame buffer. The q parameter is used to adjust pixel values for the domain child blocks of the Y component having no-motion vector or the SVQ and RVQ blocks which correspond to SVQ and RVQ identifiers, respectively. The adjusted pixels for these blocks are then moved to the current frame, except RVQ blocks which are added to a block from the current frame. In this manner, codewords from the compressor are used to move blocks from the regenerated frame buffer and the SVQ and RVQ tables to a current frame buffer to regenerate an approximation of the original frame. The regenerated frame in the current frame buffer is then used to update the regenerated frame buffer. The regenerated frame is also converted for video output at the decompressor.

A further enhancement of the present invention is the operation of the processing system in a half-frame mode. This mode begins by preferably removing the bottom sixteen lines of a QCIF image to generate a 176×128 pixel image. This image is then downsampled using a vertical filter implemented in microcode stored in the DCT processor to generate a 176×64 pixel image. In the most preferred implementation, a 3-tap filter is used as the vertical filter. The corresponding U and V components for the 176×64 pixel Y component are preferably determined by downsampling an 88×72 pixel image to an 88×32 pixel image. Preferably, this size image is generated by removing the bottom 8 lines of a U or V component image to generate an 88×64 pixel image and a vertical filter is used to generate the 88×32 pixel image. In the most preferred implementation, a 3-tap filter is used as the vertical filter for the U or V component. Compression of the downsampled image continues using the same domain block, domain child block, and domain child sub-block sizes as described above with respect to the larger pixel images. By using the same size domain blocks and segments to process the smaller frame, the frames are more quickly compressed. At the decompressor, the image is decompressed into a 176×64 pixel Y component and 88×32 pixel U and V components. These components are then vertically scaled by a factor of 2 using line doubling, a filter process available in the DCT processor or some other known scaling method. While some image quality is sacrificed as a result of the downsampling and filtering necessary to preprocess the image size, the speed in compressing and decompressing the image is substantially improved.

A system made in accordance with the principles of the present invention includes a host processor, a DCT processor, program/data memory and frame buffer memory. The DCT processor preferably includes components for scaling and filtering video frame data prior to storage of the frame data in a current frame buffer of the frame buffer memory. Preferably, the DCT processor includes a process controller and a data comparator. Preferably, the data comparator is single instruction, multiple data (SIMD) processor. In the most preferred embodiment, the DCT processor is a video codec processor in which the process controller is a reduced instruction set controller (RISC) and the data comparator is a vision processor (VP). The DCT processor of the most preferred embodiment also includes a direct memory access (DMA) controller. The program/data memory stores the program and operating data for the RISC processor which performs the overall control of the process and the frame buffer memory contains the current frame buffer, previous frame buffer and SVQ and RVQ tables discussed above. While the internal program memory of the data comparator is provided by the manufacturer with microcode to implement predetermined data functions, the program memory can also be loaded with microcode to implement the block comparison, mean calculation, and filtering operations discussed above. Preferably, the process controller supplies addresses of blocks in the current frame to the DMA controller which transfers domain blocks from the current frame buffer to an internal memory of the data comparator. The process controller then supplies previous buffer addresses or SVQ/RVQ table addresses for loading blocks from either buffer to another segment of internal memory for the data comparator. The process controller then instructs the data comparator to perform a multiple data operation on the data blocks in the internal memory. After executing an instruction, the data comparator may return a mean pixel difference, a distortion value, a motion vector, a vector identifier or a combination thereof to the process controller. The process controller uses the data returned by the data comparator to construct the codes that represent a domain block or portion thereof. The process controller entropy encodes the codes to generate a codeword and determines the cost for including the codeword in a representation of the frame data. Using the computed costs and distortion measurements, the process controller selects the codewords for representing a domain block and provides the codewords to the host processor for transmission to a remote site.

While the preferred embodiment of the present invention includes the use of a DCT processor, the method of the present invention may be utilized on a general purpose processor and still achieve better image fidelity and higher frame rates than methods previously known. Advantages gained by the present method and system are thought to arise from the variable block size used in the various comparisons to determine the codes, the cost and error thresholds used to determine whether a domain block or component thereof needs further segmentation or processing, and a costing scheme which simplifies computation of a cost yet provides an accurate indication of the value of adding another codeword to the set of codes representing a domain block.

These and other advantages and benefits of the present invention may be ascertained from the detailed description of the invention in the accompanying drawings.

DETAILED DESCRIPTION OF DRAWINGS

FIG. 4 is an example of the order in which the blocks of the Y, U, V screen components are processed in the preferred embodiment of the invention;

FIG. 12 is a depiction of a representation scheme using shape codes for identifying blocks of a lower level having their codes included to represent a domain block;

Figures 15, 16:
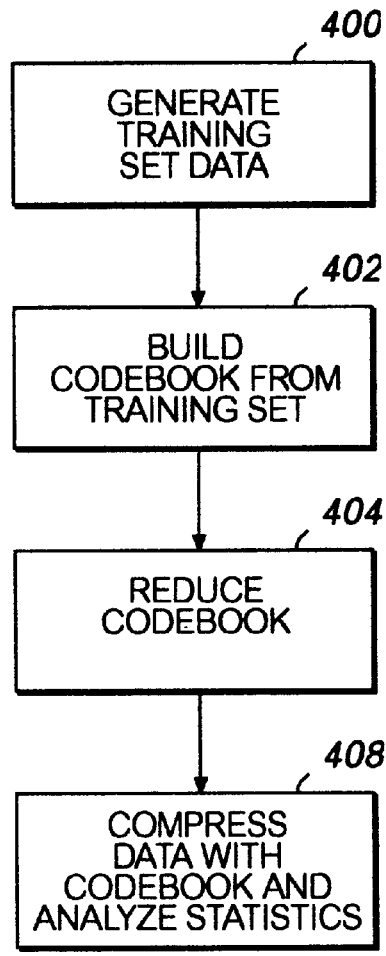
Figure 17:
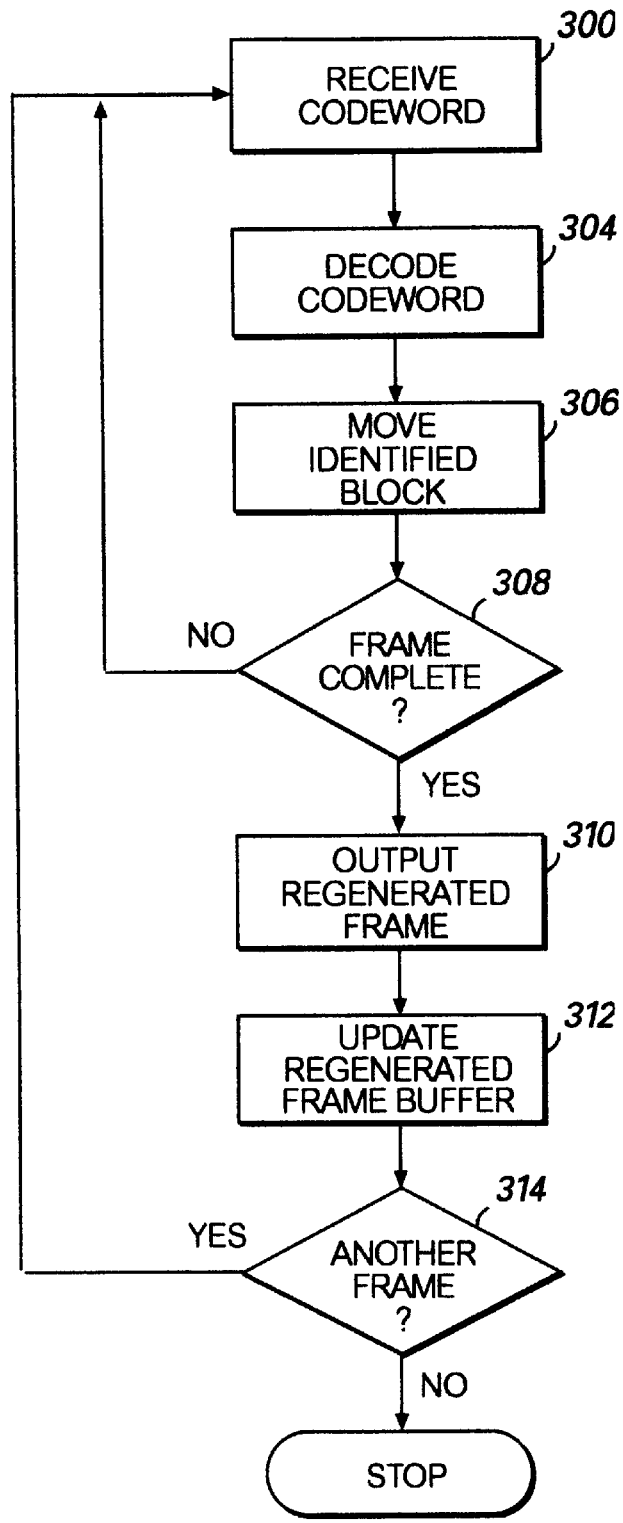
Figure 18:
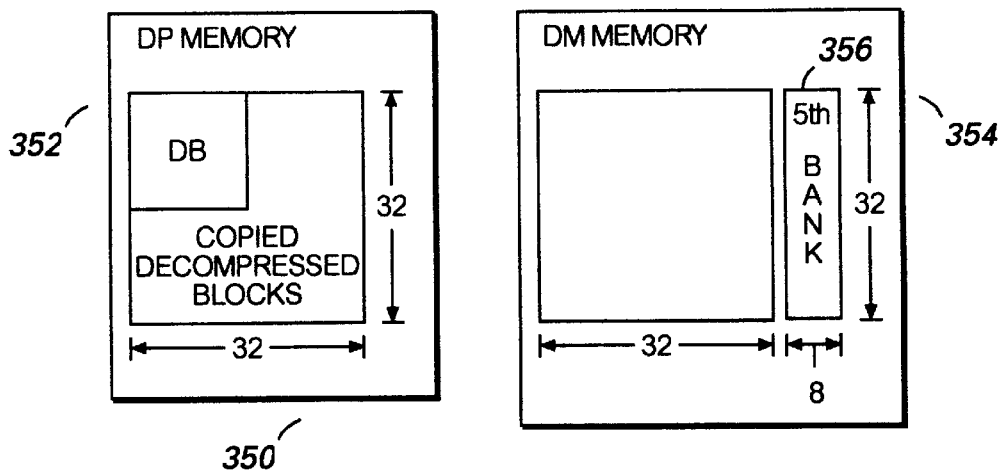
Figure 19:
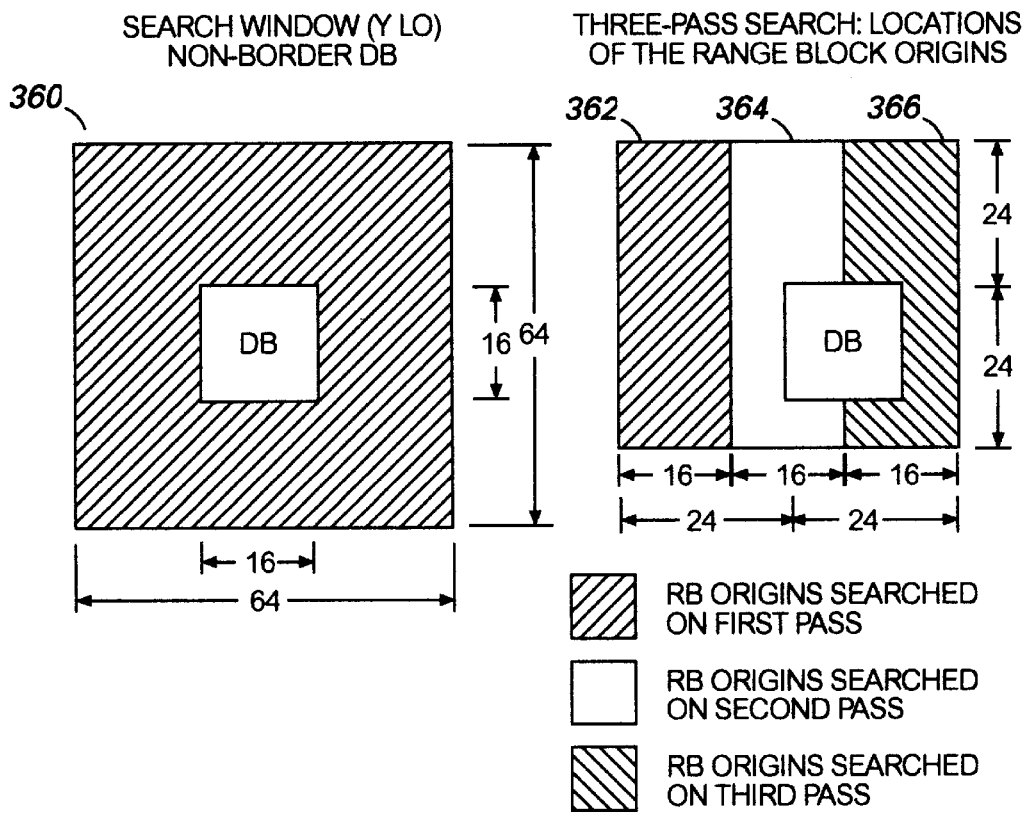

FIG. 13 is an example of level 1 and level 2 used to represent a level 0 domain block;

FIGS. 14A and 14B are examples of code structures;

FIG. 15 is a block diagram of a codeword representing a code;

FIG. 16 is a flow chart of the process for training SVQ and RVQ tables;

FIG. 17 is a flowchart of a decompression process used in the decompression of the present invention;

FIG. 18 is a block diagram of memory organization in a processor of a preferred implementation of the present invention;

FIG. 19 is a block diagram of the range block area for a checkerboard search;

FIG. 20 is a flowchart of the method used to perform an RVQ search; and

FIG. 21 is a flowchart of the pruning process for level 0 and 1 blocks in the Y component of the present invention.

DETAILED DESCRIPTION OF INVENTION

Figure 1:
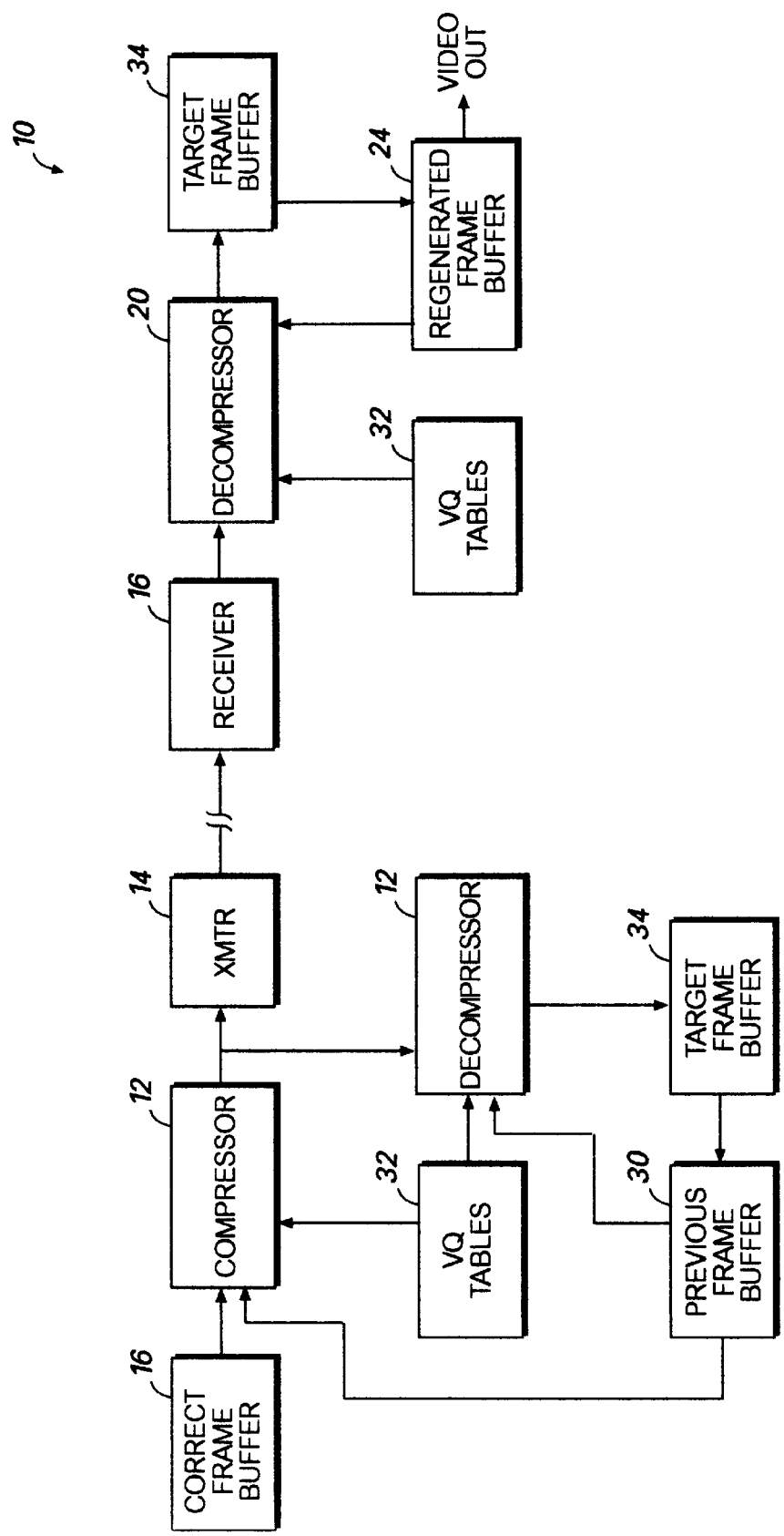
FIG. 1 is a block diagram of a system which incorporates the principles of the present invention.

A system which may be used to implement the method of the present invention is shown in FIG. 1. Using like numbers for like components, system 10 includes a compressor 12 which generates sets of codes which compress a current frame of video data contained within current frame buffer 16 or a portion thereof using data contained in previous frame buffer 30 and vector quantization memory 32. Digitized video signals from a video sequence generator, such as a camera or the like (not shown), may be preprocessed before being stored in current frame buffer 16. The sets of codes generated by compressor 12 are entropy encoded and output to a transmitter 14 which transmits the codewords representing a current frame to a receiver 18. Receiver 18 provides the codewords to a decompressor 20 which decodes them into codes for identifying, adjusting and moving data from regenerated frame buffer 24 or vector quantization memory 32 to generate a target frame that is stored in target frame buffer 34. The target frame is transferred from target frame buffer 34 to regenerated frame buffer 24 and also transmitted as a video signal for display. The codewords output by compressor 12 are also provided to a decompressor 20 which generates a representation of the current frame. Decompressor 20 builds a target frame in target frame buffer 34 and upon completion, the contents of previous frame buffer 30 are replaced by the target frame in target frame buffer 34.

Preferably, current frame buffer 16, previous frame buffer 30, target frame buffer 34 and regenerated frame buffer 24 all contain sufficient memory elements to store pixel data elements for a multiple screen component video frame. Most preferably, the frame buffer 16 is sized to store a 176×240 pixel Y component and corresponding U and V components that are 88×120 pixels each for a video frame having a width of 176 pixels and a height of 240 pixels. The frame buffers 24, 30, and 34 are sized to store a 176×144 pixel Y component and corresponding 88×72 pixel U and V components. Preferably, each pixel data element is one byte in length to define 256 levels for each of the screen components. As explained above, the U and V components of the YUV color space are typically one-quarter of the Y component array, although other ratios may be supported in the system and method of the present invention. Thus, use of the YUV color space reduces some of the computational requirements for generating the codes which best represent a current frame of video data. Although the system and method of the present invention are described in detail for the compression and decompression of frames in a video sequence, the inventive system and method may also be used to lossy compress any sequence of related data sets.

Figure 2:
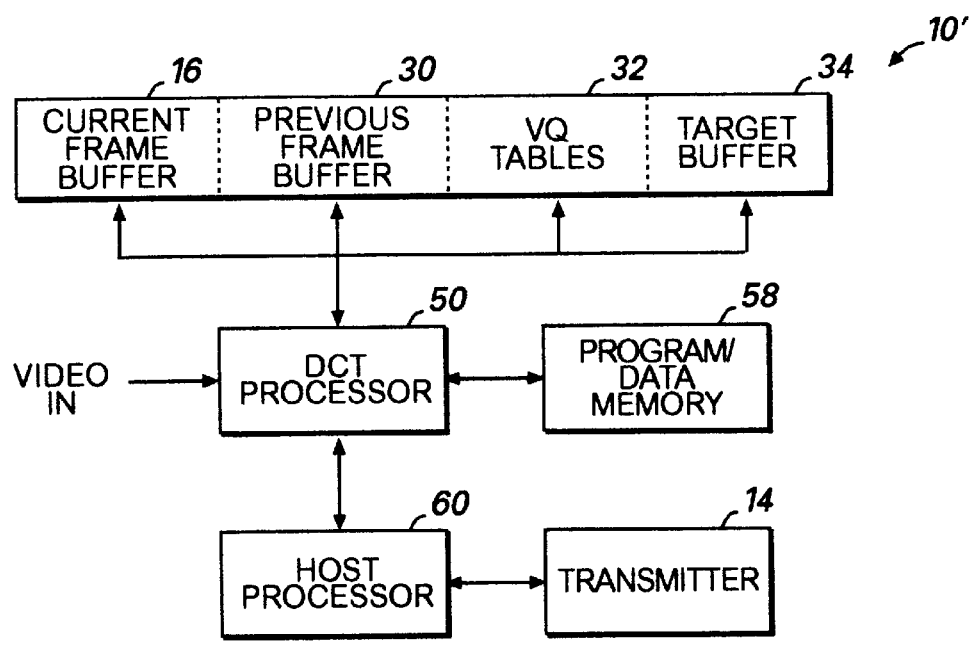
FIG. 2 is a block diagram of a preferred embodiment of the compressor shown in FIG. 1.

A preferred implementation of a compression system 10' is shown in FIG. 2. The system includes a DCT processor 50 which receives digitized video data and stores the data in current frame buffer 16. Previous frame buffer 30 contains the decompressed representation of the frame received prior to the current frame stored in buffer 16. Tables of SVQ and RVQ blocks, which are discussed in more detail below, are stored in memory 32 which is also coupled to DCT processor 50. A program and the data necessary to operate DCT processor 50 are contained in program/data memory 58. The codewords generated during the compression of the current frame are provided to a host processor 60 which provides the compressed codewords to transmitter 14. After the codes are generated for a domain block, they are used to move or add data from the previous frame buffer or SVQ and RVQ tables, along with any required pixel adjustment indicated by the codes, to target buffer 34. Thus, target buffer 34 contains the decompressed image. After a frame has been processed, the target frame buffer becomes the previous frame buffer and a new target frame buffer is selected. This eliminates the need to transfer a decompressed frame from the target buffer to the previous frame buffer following compression of the current frame. Alternatively, the decompressed blocks may be stored in the current buffer since the domain blocks in the current buffer are preferably processed in a leftmost pixel to rightmost pixel, top row to bottom row order. Thus, writing over a processed domain block does not overwrite pixel elements later used in the compression process.

In the preferred embodiment of the present invention, DCT processor 50 is a single chip video compression processor which is preferably manufactured by 8x8, Inc. of Santa Clara, Calif., and designated by the part number IIT 3104 VCP. This particular DCT processor, known as the VCP, includes a reduced instruction set controller ("RISC") and a vision processor ("VP"). The program which may be used to operate the RISC processor is contained in program/data memory 58. The VP is controlled by a micro-code program stored in a ROM and RAM internal to DCT processor 50. The manufacturer of the VCP provides a standard set of instructions which are performed by the ROM micro-code. In the preferred embodiment of the present invention, the functions performed by the VP are instead implemented by micro-code which is downloaded and stored, prior to using the compressor, in a static RAM area which is internal to the DCT processor. The VCP processor also includes static RAM, ROM and register sets for the RISC processor along with the necessary interfaces for communicating with an external host or telecommunication device, serial audio port, video input, and video output. The VP is a SIMD processor. Host processor 60 may be a personal computer ("PC"), microprocessor, or microcontroller. Alternatively, the DCT processor 50 may act as the host processor 60. The host processor is used to communicate entropy encoded codewords to the transmitter. Preferably, current frame buffer 16, previous frame buffer 30, VQ memory 32, and target buffer 34 are implemented in DRAM, although other volatile storage elements may be used. The program/data memory 58 is preferably SRAM.

Figure 3:
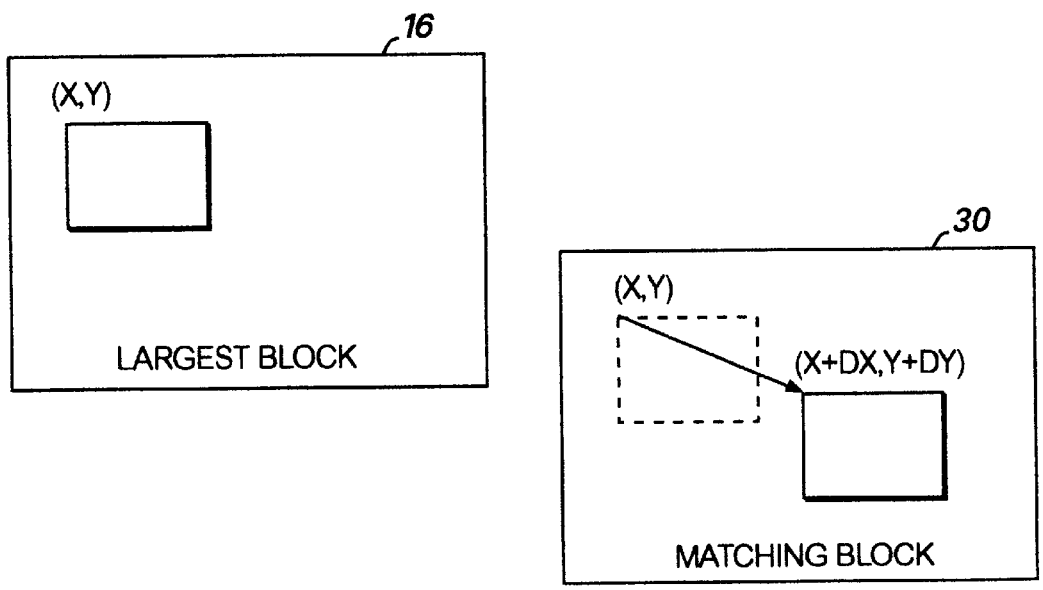
FIG. 3 is an example of a motion vector which correlates a previous frame block to a current frame block.

Preferably, system 10' generates codewords which represent the data in current frame 16 in terms of data in previous frame buffer 30 or the SVQ or RVQ tables stored in memory 32. This is preferably done by segmenting the screen components for the data in each frame buffer into blocks and determining a best match between corresponding blocks in the current frame buffer and previous frame buffer or an SVQ or RVQ table. The location of the blocks which best correspond to one another may be used to determine a motion vector or an SVQ or RVQ vector identifier. For example, FIG. 3 shows that a block in the Y component stored in current frame buffer 16 may be generated by moving a block of the Y component stored in previous frame buffer 30. The block in the current frame buffer 16 has its upper leftmost pixel data element located at (x, y). The location of the corresponding block in the Y component stored in the previous frame buffer 30 may be expressed as (x+dx, y+dy) where dx and dy describe a difference in the x and y indices which identify the upper, leftmost pixel data element for the block of the Y component of the previous frame buffer. Thus, (dx, dy) may be used to determine a spatial motion vector relative to the origin of the block which describes the movement of a block of pixels in previous frame buffer 30 to generate a block of pixels that represent a block of pixels in current frame buffer 16. A decompressor may then apply this motion vector to a corresponding block in a previous frame buffer to generate a block of video data which corresponds to a block of data in a current frame.

System 10' may also determine a best match between corresponding blocks in current frame buffer 16 and blocks stored in a Vector Quantization (VQ) table. VQ tables are a set of two dimensional blocks having predetermined pixel values. The use of VQ tables for compression and decompression of image data is well known. System 10' includes VQ tables at compressor 12 and decompressors 20. In the preferred implementation of the present invention, four VQ tables are used: three stand-alone VQ (SVQ) tables and a residual VQ (RVQ) table. Preferably, the blocks in both types of tables are 4×4 pixel blocks which have been mean-stripped. That is, using a method set forth in more detail below, SVQ and RVQ blocks are determined and then the quantized mean average of the 16 pixels comprising each block is subtracted from each pixel value. SVQ compression is performed by comparing a mean-stripped 4×4 pixel block from current buffer 16 with each block in an SVQ table. The block/SVQ block combination having the smallest distortion measurement such as an L1 distance is selected as the best match. The 4×4 mean-stripped block in the current frame buffer may now be represented by an SVQ block identifier and the quantized mean value stripped from the 4×4 pixel block in the current frame buffer. Decompressor 20 regenerates the 4×4 pixel block by retrieving the 4×4 SVQ block from an SVQ table associated with the compressor and adding the quantized mean to each pixel value in the retrieved SVQ block. This block may then be moved to target buffer 34 to build the target frame. An RVQ block is used for compression by comparing the residual of a block within current frame buffer 16 and the corresponding block in the decompressed representation of the current frame. That is, the code words generated by compressor 12 are used by a decompressor 20 to generate a target frame and the corresponding blocks in target frame buffer 34 and current frame buffer 16 are used to generate residual blocks. Pixel values for the residual block are calculated by subtracting pixel values in a block in the current frame buffer from the corresponding block in the target frame buffer. This residual block is then mean stripped and the RVQ table is searched to identify the RVQ block corresponding to the smallest distortion measurement. In the preferred implementation of the present invention, the residual blocks and RVQ blocks are 4×4 pixels in size. The residual block may then be represented by an RVQ vector identifier and a quantized mean value for the residual block. In decompression, the RVQ block identifier is used to retrieve the corresponding block from the RVQ table at decompressor 20, add the quantized mean value to the RVQ block, and then add the residual block to the corresponding block in the target frame buffer 34. Thus, the value of the pixels in an RVQ corrected block are added to a block in target frame buffer 34 while an SVQ corrected block is moved into target frame buffer 34 to replace data which may already be there.

To find a block in previous frame buffer 30 which corresponds to a block in current frame buffer 16, a search must be performed. Preferably, the search is performed by segmenting the data in current frame buffer 16 into domain blocks having a first size. In the preferred embodiment, the codewords which best represent the first domain block of the Y component are determined, followed by the first domain blocks of the U and V components. A graphic representation of this processing order is shown in FIG. 4. While this ordering scheme is preferred, others may be used without departing from the principles of the present invention. For example, the order of the U and V components may be reversed or the codewords for the Y component for all of the domain blocks may be determined, followed by a determination of the codewords for U and then the V components.

Figure 5:
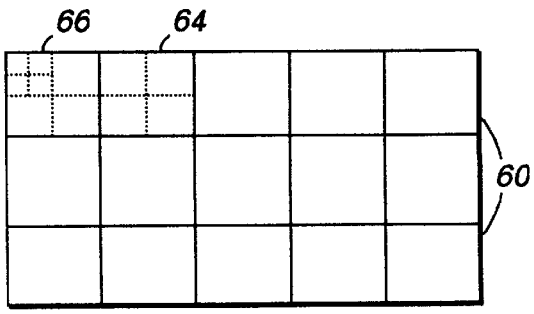
FIG. 5 is an example of segmentation of the current frame buffer or previous frame buffer into domain blocks, domain child blocks and domain child sub-blocks.

Preferably, the method of the present invention performs level searches on the domain blocks for each component of a video frame. These levels correspond to different sizes of blocks in the current frame buffer which are compared to blocks of the same size either in the previous frame buffer or in the VQ tables. These levels are shown, for example, in FIG. 5. There, level 0 is comprised of domain blocks 60. These level 0 domain blocks may be further subdivided into level 1 domain child blocks 64 which are each preferably one quarter of the domain block from which they were segmented. Each domain child block 64 may be further segmented into level 2 domain child sub-blocks 66. In the depiction shown in FIG. 5, the blocks 60, 64 and 66 represent levels 0, 1, and 2, respectively for the Y component. Preferably these blocks are 16×16, 8×8 and 4×4 pixels, respectively, in size. Because the U and V components are one quarter the size of the Y component, level 0 and level 1 blocks are comprised of domain blocks of the 8×8 pixel size and domain child blocks are of the 4×4 pixel size. These levels and their corresponding block sizes are exemplary only and are not a limitation of the present invention.

Figure 6:
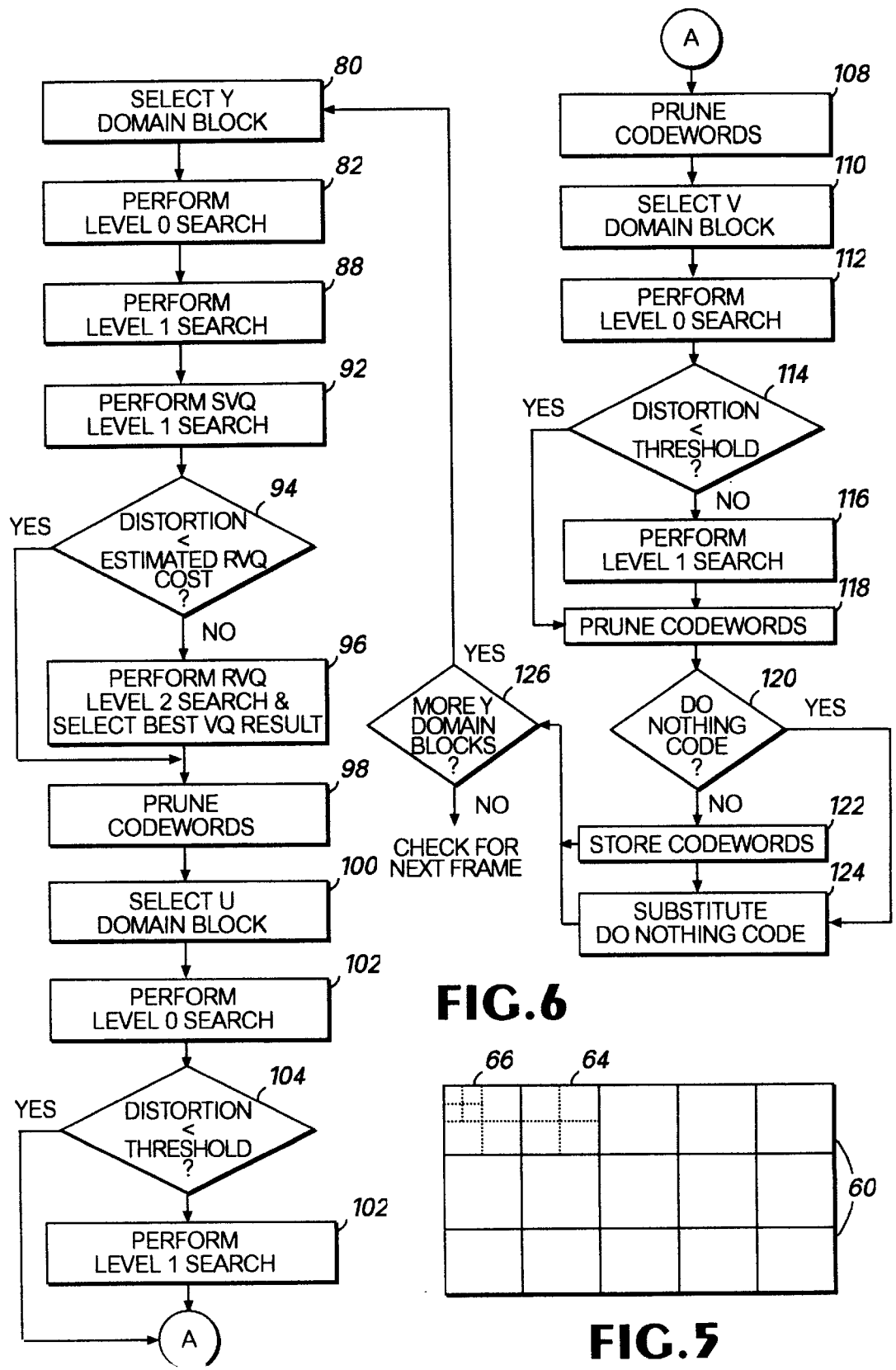
FIG. 6 is a flowchart of the preferred method of compressing data at a high level.

The high level process for compressing the data in the current frame buffer 16 is shown in FIG. 6. The process begins by selecting a Y domain block (block 80) and performing one or more level 0 searches for the best corresponding block at level 0 (block 82). A best representation at that level is determined and an error or distortion measurement and a bit cost for the codeword which represents the level 0 domain block is returned. A level 1 search for each level 1 domain child block is then evaluated by comparing the portion of the level 0 distortion measurement attributable to the level 1 domain child block to an estimated cost for the level 1 search for that level 1 domain child block. The level 1 search for the Y component domain child block is performed if the estimated cost is less than the level 0 distortion measurement attributable to the domain child block (block 88) and the distortion measurement is returned. After the level 1 blocks are processed, the SVQ searches for the level 2 blocks are performed (block 92). Then, the distortion measurement attributable to each level 2 domain child sub-block is compared to an estimated RVQ cost for a level 2 search for each level 2 domain child sub-block (block 94). If the estimated cost is less than the attributable error, an RVQ search is performed and the SVQ or RVQ result having the least cost is selected for the level 2 search (block 96).

At this juncture, codes for blocks at each level have been determined. These codes are now evaluated to determine which ones are retained for representation of the domain block and which ones are excluded or "pruned" from the representation. The pruning (block 98) is performed by comparing the cost for a block to the error at the next higher level that is attributable to the block. For example, the cost of the code for a level 2 block is compared to the distortion measurement for the portion of the level 1 block which corresponds to the level 2 block. If the level 2 block code cost is less than the distortion measurement for the corresponding portion of the level 1 block, the code for the level 2 block is included in the set of codes used to represent the domain block. The total cost of the codes that represent the domain child block is then adjusted to reflect the inclusion of the level 2 block code. Pruning is performed for all level 2 blocks for each level 1 block and then performed for all level 1 blocks for the level 0 block. At the end of pruning, a set of codes representing the domain block has been determined.

The domain block in the U component which corresponds to the domain block in the Y component just processed is selected (block 100), and a level 0 search is performed (block 102). If the distortion measurement for level 0 exceeds a predetermined threshold (block 104), then the level 1 blocks are processed. For each level 1 block, if the portion of the distortion measurement attributable to the level 1 block exceeds a second predetermined threshold, a level 1 search is performed (block 106). The cost for each codeword for the level 1 blocks are compared to the distortion measurement for the corresponding portion of the level 0 block. The codes for the level 1 blocks which have a cost less than the corresponding distortion measurements are included in the codes which represent the domain block of the U component (block 108). The corresponding domain block in the V component is then likewise processed (blocks 110, 112, 114, 116, and 118).

When all of the codewords for all components for a domain block have been selected, the process determines whether a do-nothing code may be used to represent the domain block (block 120, 122, 124). A do-nothing code indicates that the corresponding block in the previous frame buffer may be used for the domain block in the regenerated frame. The do-nothing code can be used to represent the domain block in the current frame buffer if the cost of representing the domain block with a do-nothing code is less than the cost of representing the domain block with the set of codes remaining after the previously described pruning. Alternatively, the evaluation to determine whether a do-nothing code can be used to represent the domain block may occur after the Y domain block but before the U and V domain blocks have been processed or at other points in the searches. If there are any remaining domain blocks in the Y component (block 126), the process continues. Otherwise, the process looks for a next frame.

Figure 7:
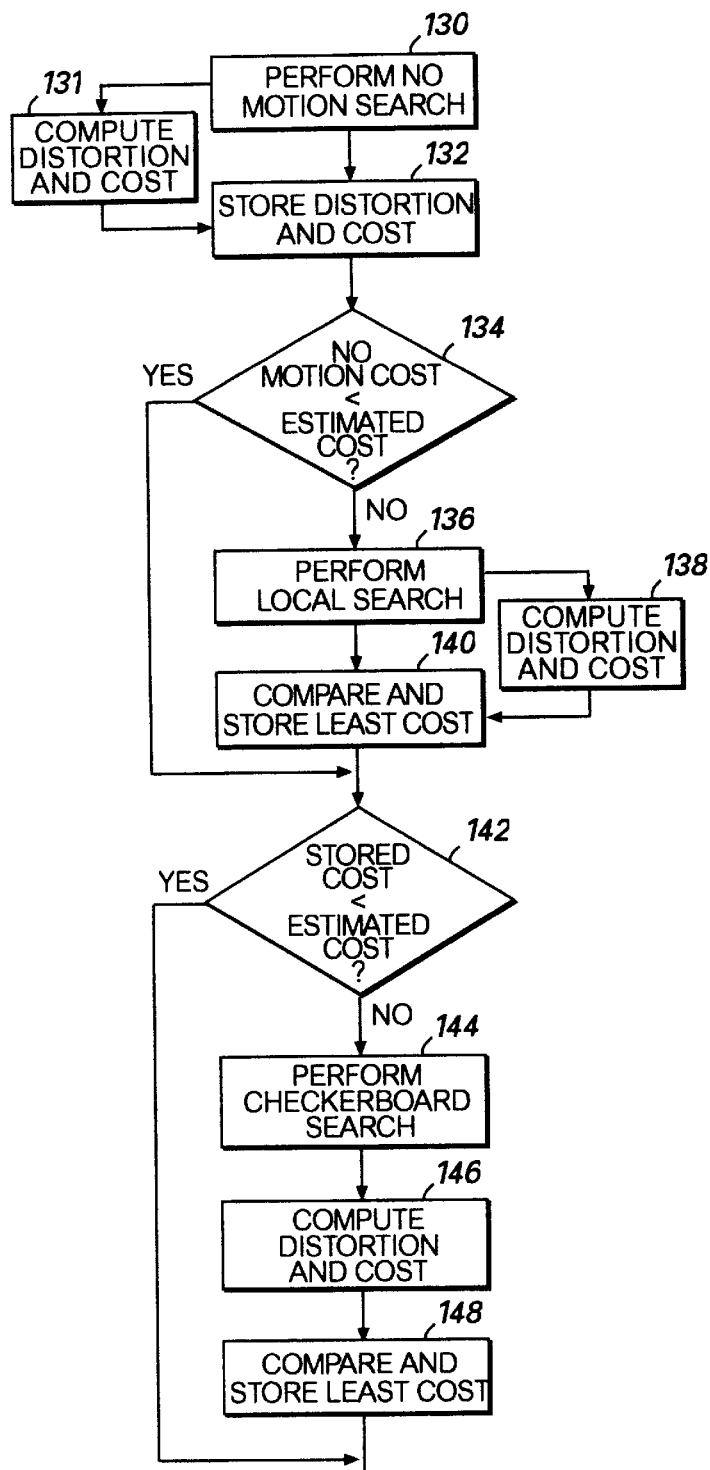
FIG. 7 is a flowchart of the preferred process for performing the level 0 block search for the Y component shown in FIG. 6.

The level 0 search process is shown in more detail in FIG. 7. The process begins with a no-motion search (block 130) and the distortion measurement and cost for the codeword representing a no-motion block is computed (block 131) and stored (block 132). This no-motion search is an initial search for which an initial codeword is determined. An estimated cost for a local search is then computed and compared to the no-motion cost (block 134). If the estimated cost for the local search exceeds or equals the no-motion cost, then the local search is not performed. Otherwise, a local search is performed (block 136) and the distortion measurement and codeword cost corresponding to the best correspondence which is determined by the smallest distortion measured during the local search is computed (block 138). The cost of the no-motion search and local search are compared and the codes for the best correspondence having the least cost are stored (block 140). An estimated cost for a checkerboard search is then computed and compared to the least cost selected (block 142). If the estimated cost exceeds or equals the lowest selected cost, the checkerboard search is not performed. Otherwise, a checkerboard search is performed (block 144) and the smallest distortion measure and corresponding codeword cost for the best correspondence is computed (block 146). The cost of the best correspondence found in the checkerboard search is compared to the cost for the best correspondence found between the no-motion and local search and the best correspondence having the least cost is selected (block 148). The codes corresponding to this least cost establish the codes which best represent the level 0 block.

In more detail, a no-motion search is performed by specifying the location of the upper-most, left-most pixel of the domain block in the current frame buffer 16. The data values for the pixel elements comprising the level 0 domain block at that location are then compared to the data values of the same pixel locations in the previous frame buffer 30. The block of pixel elements in the previous frame buffer 30 comprise a range block. Preferably, the pixel by pixel comparison is a subtraction operation and the sum of the absolute differences of the pixel elements between the domain and the range block constitute the distortion measurement. This preferred distortion measurement is known as a sum of absolute differences or L1 distance, although other measurements such as the sum of squared differences or L2 distance or the like may be used. The cost of a codeword for representing the no-motion vector is computed and stored. As discussed in more detail below, this codeword represents the codes for a shape and no-motion vector. This value differs from a do-nothing code which is a one bit code that indicates no codes follow for any of the Y, U, or V components of the domain block.

Figure 8:
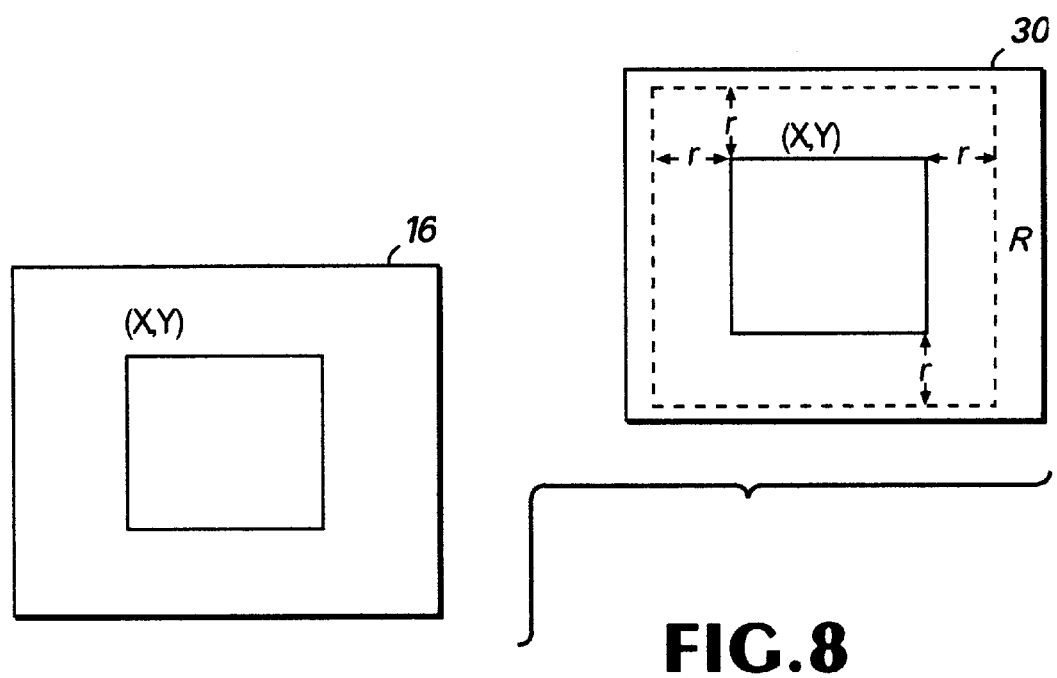
FIG. 8 is a diagram of a range area for a search.

A local search is performed by comparing the selected level 0 domain block to a plurality of range blocks in the previous frame buffer. FIG. 8 shows how this comparison is performed for a block within the interior of the frame. The search begins by locating the pixel in previous frame buffer 30 which corresponds to the upper, leftmost pixel of a selected domain block in current frame buffer 16. Using a radius parameter, a range area R is identified in previous frame buffer 30. Corresponding blocks are then formed from the pixels within this range area and compared to the pixel values in the domain block. Preferably, this comparison is performed by selecting the pixels corresponding to the domain block size and shape which have as their upper, leftmost pixel the upper, leftmost pixel of the range area. The next block to be compared is identified by adding 1 to all of the x indices of these pixels. This continues until the corresponding range block in the range area has its rightmost boundary aligned with the rightmost boundary of the range area. The next block to be searched is found by incrementing the y coordinate for all of the pixels in the corresponding domain block and resetting the x coordinate value to the leftmost boundary. Blocks in this new line are formed by increasing the x coordinate one pixel at a time until the rightmost boundary of the corresponding range block is aligned with the rightmost boundary of the range area. This moving of the corresponding block within the range area in a left to right and top to bottom manner continues until all of the possible domain size blocks within the range area are compared to the domain block in the current frame buffer 16.

In the preferred local search process, the radius about the domain block which defines the range area is seven pixels in length. If the domain block has a side which is at the edge of the current frame buffer, the corresponding range area in the previous frame buffer stops at the edge of the previous frame buffer. As a result, the number of range blocks in the range area is decreased and the search time for the local search is correspondingly decreased.

In more detail, the checkerboard search (block 144, FIG. 7) is preferably performed by increasing the range area, but the range blocks compared to the domain block are formed differently than the range blocks used for the local search. In a checkerboard search, the range blocks are selected by beginning with the upper-most, left-most pixel in the range area and selecting the pixels which correspond to the same size as the domain block, as was done in the local search. Thereafter, the x coordinate is increased by 2 and the next block of pixels corresponding to the range block are selected for comparison to the domain block in the current frame buffer. This process continues with the incrementing of the x coordinate by 2 until the right-most edge of the corresponding range block is coincident with the right-most edge of the range area. The next range block is then selected by increasing the y coordinate by 2 and resetting the x coordinate to the left-most edge of the range area. The x coordinate is increased by 2 to form range blocks until the rightmost edge of a range block is coincident with the rightmost edge of the range area. This moving of the corresponding block within the range area in a left to right and top to bottom manner continues until all of the possible domain size blocks within the range area are compared to the domain block in the current frame buffer 16. As a result, the range area is expanded for the checkerboard search but the search is not exhausted for every possible range block which may be included in this expanded area. This search is performed to see if better matches exist further away from the corresponding domain block without requiring the process to search every possible range block in the expanded range area.

To further decrease the number of data elements to be processed in the checkerboard search, the distortion measurement is only computed between every other row of the domain and range blocks. That is, only those pixel elements on alternating rows beginning with the top-most row of the range block are subtracted from the corresponding pixel elements in the corresponding rows of the domain block in the current frame buffer. This provides a rough approximation of one half of the distortion measurement normally obtained in the comparison between a domain block and a range block. The smallest distortion measurement for a domain block/range block comparison is selected as the best correspondence for the domain block and then the true distortion measurement for that block is calculated. The motion vector which corresponds to this best correspondence is used to select a codeword which may represent the domain block.

The memory organization of the VP processor used in the preferred implementation is shown in FIG. 18. Memory 350 is comprised of two segments—DP memory 352 and DM memory 354. In the preferred implementation, DP memory 352 is used to store the domain block and blocks associated with the domain block while the DM memory is used to store range blocks. The range blocks may be blocks from the previous frame buffer or one of the VQ vector tables as discussed in more detail below. As shown in FIG. 18, DP memory 352 is preferably 32×32 storage elements. As the domain blocks in the preferred implementation are 16×16 elements, the remaining storage in the DP memory may be used to store duplicates of portions of the domain block, such as the 8×8 element quadrants or 4×4 element block quadrants of the 8×8 element blocks, to facilitate distortion measurement calculations. DM memory 354 is preferably organized as a 32×36 pixel memory with an associated 8×36 element memory, denoted as fifth bank 356 in the figure. Preferably, the fifth bank is used to hold intermediate results when the range blocks in the 32×36 section are from the previous frame buffer; however, it can be used to store SVQ or RVQ blocks or vectors, when the range blocks are from one of the VQ tables.

In the preferred embodiment of the system implementing the method of the present invention, the origin of a level 0 domain block is provided to a direct memory access (DMA) controller of the VCP which preferably loads DP memory 352 associated with the VP of the VCP with the pixel elements of the domain block. To perform a no-motion search, the RISC processor provides the origin of the corresponding range block to the DMA controller which preferably transfers the corresponding range block from the previous buffer to DM memory 354 associated with the VP. The RISC processor then provides an instruction to the VP causing it to execute the corresponding micro-code in the static RAM for a no-motion distortion measurement. In response to this micro-code, the VP subtracts the pixel elements of the range block from the domain block and sums the absolute values of the differences to provide a distortion measurement which is returned to the RISC processor.

To perform the local search in the preferred embodiment, the RISC processor computes the left-most, upper-most pixel coordinates for the origin of the range area and provides that origin to the DMA controller. The DMA controller preferably transfers the range area elements to DM memory 354 associated with the VP. The RISC processor then provides the VP with the instruction for comparing the domain block to the range blocks in the local search range area. In response, the VP executes the microcode corresponding to the instruction and calculates the distortion measurement between the domain block and each of the range blocks to be selected from the range area stored in DM memory 354 associated with the VP. The smallest distortion measurement is then used to identify the range block which best corresponds with the domain block and the corresponding motion vector for that range block and its distortion measurement are provided to the RISC processor. The RISC processor then performs an entropy encoding of the codes corresponding to the motion vector and computes a cost. The cost for the local search, if performed, is compared to the cost computed for the no-motion search and the codes corresponding to the least cost are selected as representing the domain block pending the results of the checkerboard search, if performed.

To perform the checkerboard search in the preferred embodiment, the RISC processor computes the left-most, upper-most pixel coordinates for the origin of the range area and provides that origin to the DMA controller. The DMA controller preferably transfers the range area elements to DM memory 354 associated with the VP. Preferably, the range area elements from the previous frame buffer only include the elements from every other row. This is called packed mode range loading and is preferably done so DM memory 354 holds more range blocks and more comparisons may be performed while minimizing the reloading of DM memory 354. In this mode, the Y coordinate is increased by only one when the right-most edge of the current range block is at the right-most edge of the range area. The RISC processor then provides the VP with the instruction for comparing the domain block to the range blocks in the checkerboard range area. In response, the VP executes the micro-code corresponding to the instruction and calculates the distortion measurement between every other row at the domain block and each of the range blocks to be selected from the range area stored in the memory associated with the VP. This distortion measurement approximates one-half of the L1 distance between the domain block and a range block. The smallest distortion measurement is then used to identify the range block which best corresponds with the domain block and the corresponding motion vector for that range block and distortion measurement is provided to the RISC processor and then the true distortion measurement for the selected range block is calculated. The RISC processor then performs an entropy encoding of the codes corresponding to the motion vector and computes a cost. The cost for the checkerboard search, if performed, is compared to the previously selected least cost and the codes corresponding to the least cost are selected as best representing the domain block.

Most preferably, the RISC processor supplies the coordinates of the range area for the checkerboard search to the DMA controller, one third of the range area at a time. This is done in the most preferred embodiment because the memory limitations of DM memory 354 do not permit the loading of the entire range area defined by the corresponding domain block location in the previous frame buffer with a preferred range area radius of 24 pixels. As shown in FIG. 19, the preferred range area 360 for a checkerboard search for a domain block other than a border domain block is a 64×64 element range area. Thus, the first one third range area is a 32×32 element area which is loaded using packed mode into DM memory 354. This area corresponds to the 16×49 origin area 362 shown in FIG. 19. After the domain block/range combination corresponding to the smallest distortion measurement is determined and the cost for its corresponding codeword computed, the second and third range areas 364, 366 corresponding to the second and third origin areas are processed. The codeword corresponding to the lowest cost between the three checkerboard searches is then selected as the best checkerboard codeword.

In the preferred implementation, the checkerboard range area is clipped for border domain blocks. Border domain blocks are those domain blocks that either (1) have a left-most edge at the first column or a right-most edge at the last column, (2) have a left-most edge at the second column or a right-most edge at the next-to-last column, or (3) have a top or bottom edge at the first, second, next-to-last or last row. Border domain blocks corresponding to (3) may also conform to definitions (1) or (2). For the first type of border domain block, the range area is defined by range block origins within a +16 or −16 element horizontal range, ±24 element vertical range about the border domain block. This range area is preferably searched in one pass. The second type of border domain block has a range area defined by range origins within a ±16 element horizontal range, ±24 element vertical range about the border domain block. This range area is preferably searched in two passes. The third type of border domain block has a range area that corresponds to the portion of the range area that lies within the previous frame buffer.

Figure 9:
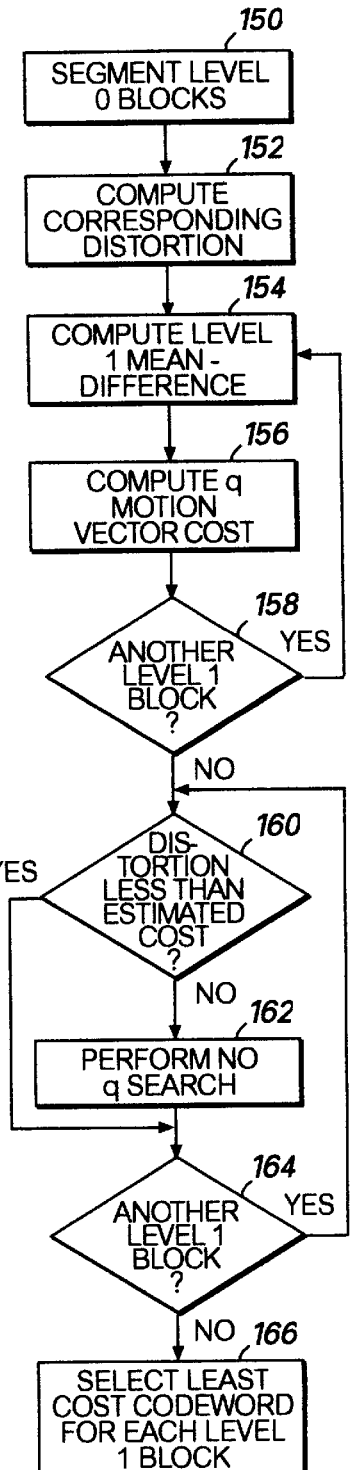
FIG. 9 is a flowchart of the preferred process for performing a level 1 block search for the Y component shown in FIG. 6.

The level 1 process for the Y component is shown in more detail in FIG. 9. The process for level 1 begins by segmenting the level 0 domain block into a plurality of level 1 domain child blocks (block 150). Preferably, these blocks are each one quarter of the size of the domain block and do not overlap. The portion of the distortion measurement for the selected least cost level 0 codeword attributable to each level 1 block is computed (block 152). The first domain child block is selected and the mean pixel difference between the domain child block and its corresponding range child block in the previous frame buffer is computed (block 154). Preferably, this mean difference (q) is computed by calculating the difference between the sum of the pixels in the domain child block and the sum of the pixels in the range child block and dividing the difference by the total number of pixels in the domain child block. The cost for the codeword which represents the mean pixel difference (q) and a no-motion vector is then computed (block 156). The process then checks to see if another domain child block should be processed (block 158) and calculates the mean pixel difference, the corresponding codes, and the cost for the corresponding codeword to represent the codes for each domain child block of level 1. The process continues by determining whether a level 1 search is to be performed (block 160). Preferably, this is determined by comparing an estimated level 1 cost for a level 1 block to the distortion measurement for the level 0 block attributable to the level 1 block. If the estimated cost is less than the distortion measurement, a level 1 range area is defined in the previous frame buffer for one of the domain child blocks and each range child block within that range area is compared to the domain child block (block 162). Preferably, the range area in the previous frame buffer corresponds to the portion of an area six (6) pixels beyond the domain child block boundary in the horizontal directions and six (6) pixels beyond the domain child block boundary in the vertical direction that lie within the previous frame buffer. The search includes determining a distortion measurement for each block comparison. The search selects the domain child block/level 1 range child block combination having the smallest distortion measurement as the best correspondence for the domain child block. The codes representing the motion vector corresponding to the domain child block/level 1 range child block having the smallest distortion measurement are selected and the cost for the codeword representing the codes is computed. This search is performed for each domain child block where the estimated cost is less than the distortion measurement (block 164) until all of the child blocks have been evaluated. For each domain child block where the search was performed, the cost for the codeword representing the motion vector for the selected range child block without a mean pixel difference is compared to the cost for the codeword for the mean difference and no-motion vector and the codeword having the lowest cost is selected for representing the domain child block (block 166). The cost for a set of codes preferably corresponds to the number of bits for a codeword generated by an entropy encoder to represent the code set. Preferably, the entropy encoder is constructed for code sets which either have a motion vector and no q value or a q value and no-motion vector, or which have no-motion vector or q value. Thus, no codeword bits are used to represent a zero motion (0,0) vector when the q value !=0 or a q value=0 and the motion vector !=0.

In the preferred embodiment of the present invention, the process shown in FIG. 9 is performed by having the DMA controller transfer the range area to the VP and then a level 1 mean calculation instruction is transferred from the RISC processor to the VP. In response, the VP executes the micro-code which causes the VP to sum the pixel values of a domain child block and corresponding range child block, take the difference between the sums, compute the mean value of the difference, and quantizes the mean. The VP then calculates the distortion between the domain child block and mean-adjusted range child block and returns the distortion and quantized mean to the RISC processor. Quantizing the mean is an operation which is discussed in more detail below. The RISC processor then determines the codeword for the q value and no-motion vector for each domain child block and the corresponding cost. The RISC processor sends to the DMA controller the origin of the level 1 range area and the pixel elements for the level 1 range area are transferred to DM memory 354. The RISC processor then passes the instruction for a no-q search, if the estimated level 1 cost is less than the attributable distortion measurement, and in response, the VP executes the corresponding micro-code. The range child blocks within the level 1 range area are then compared to the domain child block to determine the corresponding distortion measurement for evaluated domain child block/level 1 range child block combinations. The least distortion measurement and corresponding motion vector are returned to the RISC processor. The RISC processor determines the corresponding codeword and the cost for that codeword. The RISC processor then selects the lowest cost codeword between the motion search, if performed, and the q/no-motion search for each domain child block.

Figure 10:
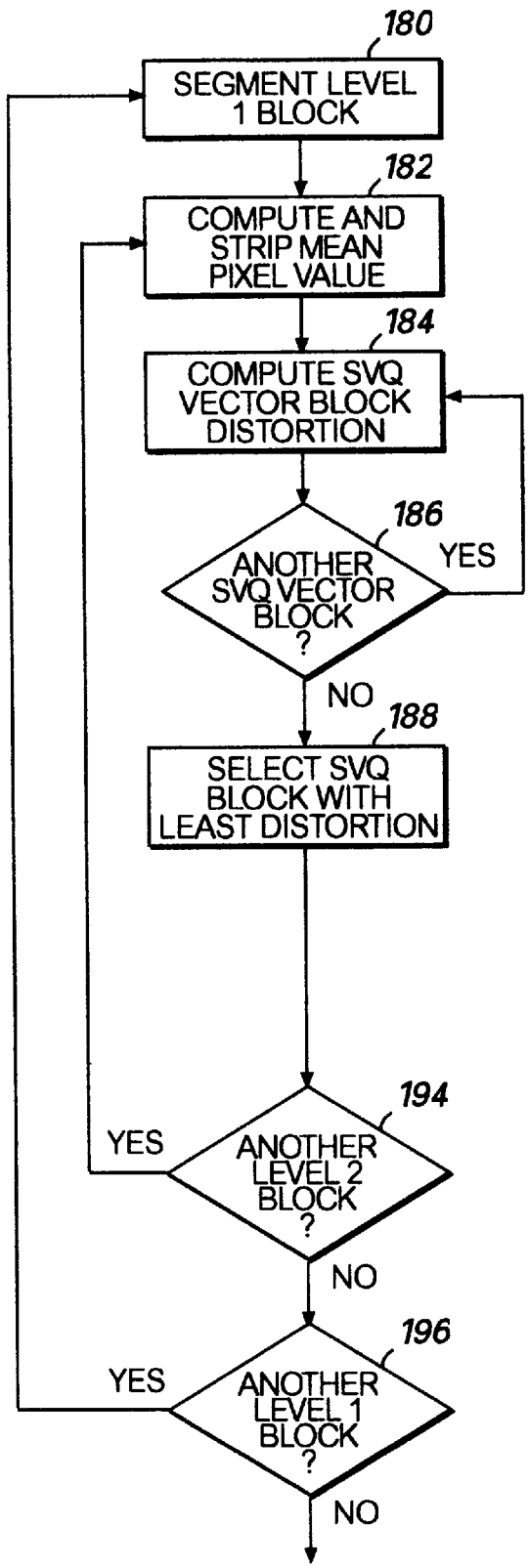
FIG. 10 is a flowchart of the preferred process for performing a level 2 SVQ search for the Y component shown in FIG. 6.

The process for the level 2 SVQ search for the Y component (block 92, FIG. 6) is shown in more detail in FIG. 10. The process begins by segmenting one of the domain child blocks into domain child sub-blocks and computing the portion of the distortion measurement for the selected least cost level 1 codeword attributable to each domain child sub-block (block 180). Preferably, the domain child sub-blocks are non-overlapping quadrants of the domain child block, although other subdivisions of the domain child block are within the principles of the present invention. The mean pixel value is stripped for each domain child sub-block and is computed (block 182) by summing all of the pixel values and dividing by the number of pixels. The mean pixel value is quantized as discussed in more detail below. This quantized mean value is subtracted from each pixel element in the domain child sub-block. This mean-stripped domain child sub-block is then compared to each block of an SVQ (Stand-Alone Vector Quantization) table to determine a least distortion measurement (block 184). Preferably, the comparison is made between the domain child sub-block and each SVQ block (block 186). The smallest distortion measurement between the domain child sub-block and the SVQ blocks is used to select the SVQ block which is the best correspondence for the domain child sub-block (block 188). When all of the domain child sub-blocks for a domain child block have been processed, the process determines whether additional domain child blocks need to be segmented (block 194). If additional domain child blocks remain, the process continues by segmenting them into domain child sub-blocks and the process continues (block 196). Otherwise, the process proceeds as shown in FIG. 6.

In the preferred embodiment of the present invention, the RISC processor provides the address coordinates for the SVQ blocks to the DMA controller which downloads the SVQ blocks into DM memory 354. The RISC processor then sends a Y level 2 SVQ search instruction to the VP processor. In response, the VP processor executes the corresponding micro-code and determines a distortion measurement between the indicated domain child sub-block and each SVQ block. The smallest distortion measurement and corresponding SVQ block identifier and quantized q value are returned to the RISC processor.

After the SVQ search, a determination is made as to whether a residual search is performed (block 94, FIG. 6). The residual search for a domain child sub-block (block 96, FIG. 6) is performed if the estimated cost for a residual search for a domain child sub-block is less than the portion of the distortion measurement for the domain child block that is attributable to the domain child sub-block. A residual vector quantization (RVQ) evaluation for a domain child sub-block is performed as shown in FIG. 20. The domain child sub-blocks generated as discussed above with respect to the SVQ processing are selected and processed (block 380). First, the difference between each pixel in the domain child sub-block and the corresponding pixel in the range child sub-block corresponding to the selected level 1 codeword is computed and stored (block 382). The mean pixel value for this pixel difference block is then computed, quantized, and subtracted from each value in the pixel difference block (block 383). This mean-stripped domain child residual sub-block is then compared to each block of an RVQ (Residual Vector Quantization) table to determine a distortion measurement (block 384). Preferably, the comparison is made between the domain child residual sub-block and each RVQ block (block 386). The smallest distortion measurement between the domain child residual sub-block and the RVQ blocks is used to select the RVQ block which is the best correspondence for the domain child residual sub-block (block 388). The codes representing this block include an RVQ block identifier and the quantized mean value. The cost of the codeword representing the codes for the RVQ block is compared to the cost for the selected SVQ codeword for the domain child sub-block (block 390). If the cost of the codeword for the RVQ block is less than the cost for the codeword for the SVQ block, the codeword for the RVQ block is selected (block 392) and a check is made to determine whether additional domain child sub-blocks exist for the selected domain child block which have not been processed (block 394). If the cost of the SVQ codeword is less, then it is selected. If additional domain child sub-clocks remain, the residual search process continues (block 384). When all of the domain child sub-blocks for a domain child block have been processed, the process determines whether additional domain child blocks need to be segmented (block 396). If additional domain child blocks remain, the process continues by segmenting them into domain child sub-blocks and the process continues. Otherwise, the process continues at block 98 as shown in FIG. 6.

The selection of code words to represent the domain block (98, FIG. 6) requires a pruning of the quadtree codes identified by the level 0, level 1, SVQ, and RVQ searches performed as discussed above. This pruning process is shown in more detail in FIG. 21. Beginning at the lowest level, which in the preferred implementation is level 2, the cost of the selected codeword for the lowest level child block (block 450) is to compared to the portion of the distortion measurement of the next higher level block which is attributable to the lower level block (block 452). If the cost exceeds or equals this error, the child code is not included in the code word for representing the domain child block. If the cost of the lower level code is less than the error attributable to the lower level child block, the child code is accepted in the representation of the domain child block and the cost of the domain child block is recomputed (block 454). In the preferred implementation, the current cost of the code word for the domain child block is reduced by a quantity corresponding to the portion of the distortion measurement attributable to the lower level block and incremented by the cost corresponding to the code word for the lower level block. This pruning is done for all of the lower level domain child sub-blocks (blocks 450, 452, 454, 456), then it is performed for all of the domain child blocks to determine the cost and the code words for representing the domain block (blocks 458, 460, 462, 464).

Figure 11:
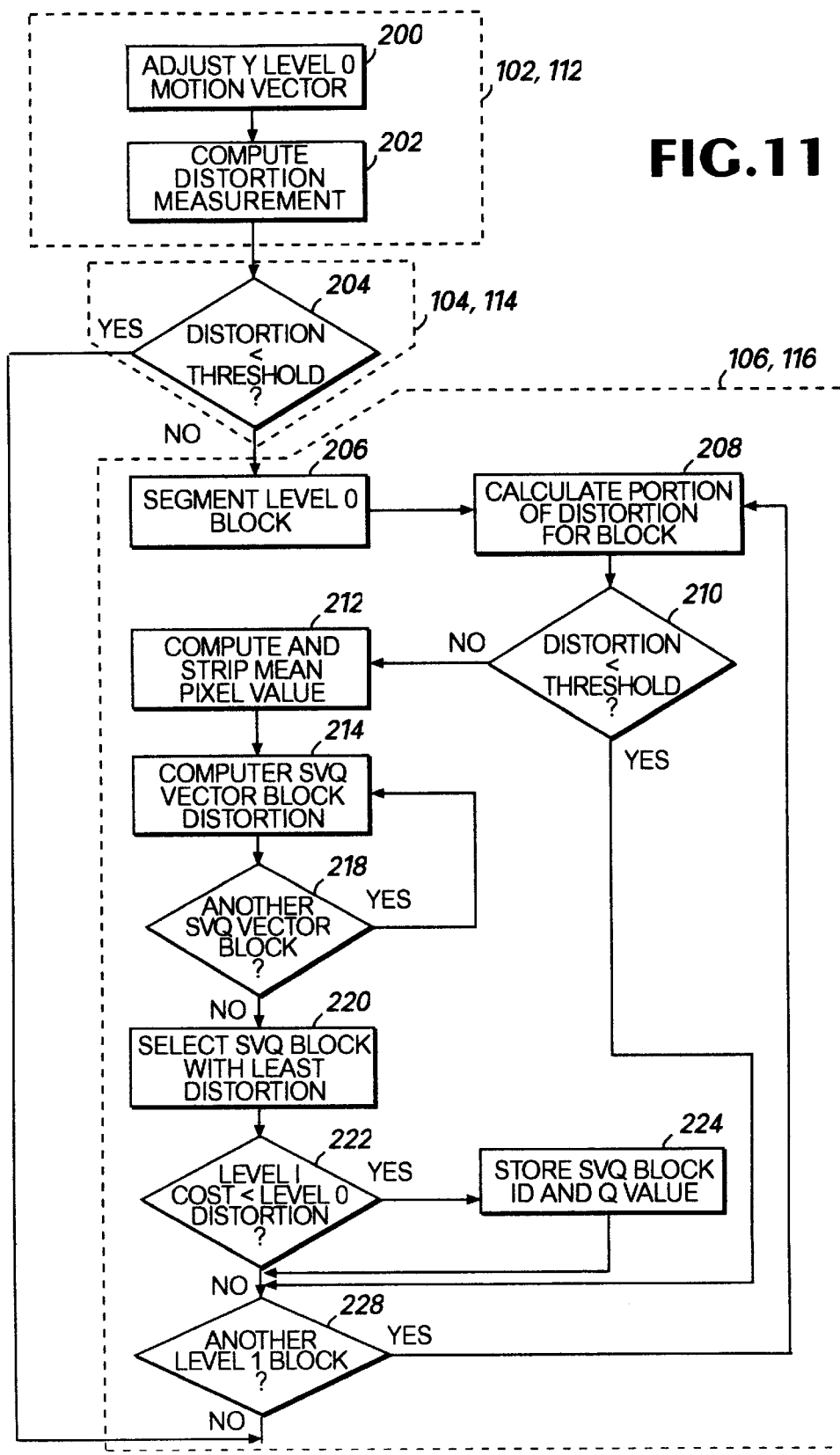
FIG. 11 is a flowchart of the preferred process for performing the level 0 and level 1 block search for a U or V component shown in FIG. 6.

The level 0 search for the U and V components is shown in more detail in FIG. 11. That process begins by computing the distortion measurement between the domain block and the corresponding no-motion range block. The process then continues by adjusting the motion vector used to represent the corresponding level 0 domain block in the Y component (block 200). Preferably, this adjustment is the division of the motion vector for the Y component domain block by 2, which is performed by shifting the X and Y components of the motion vector right one bit position. The range block corresponding to the origin identified by this adjusted motion vector is then compared to the U or V component domain block and a distortion measurement determined (block 202). The distortion measurement is compared to a threshold to determine whether a level 1 search should be performed (block 104, FIG. 6). If the threshold is exceeded, the level 0 block is then segmented into a plurality of level 1 blocks (block 206, FIG. 11). The portion of the distortion measurement attributable to each level 1 block is computed (block 208). This distortion measurement is compared to a second threshold (block 210). If the threshold is exceed, another level 1 block is selected (block 228). If the threshold is not exceeded, the block mean for each of those level 1 blocks is calculated, quantized, and stripped from the block as previously described for the SVQ search (block 212). The mean-stripped block is then compared to the SVQ blocks stored in an SVQ table for the corresponding U or V component and the SVQ vector block distortion is computed (blocks 214). If another SVQ block exists for the selected block (block 218), the process proceeds to block 212. If another block does not exist, the process proceeds to block 220. The SVQ block corresponding to the smallest distortion measurement is used to select an SVQ block identifier (block 220). The SVQ block identifier and corresponding quantized mean value are used to determine a codeword for each level 1 block. The cost for each codeword for the level 1 blocks is compared to the distortion measurement for the portion of the level 0 block which corresponds to the level 1 block (block 222). If the cost of the level 1 block is less, its codes are added to the set of codes which represent the domain block (block 224). Otherwise, it is discarded. The process continues until all of the level 1 blocks have been processed (block 228).

Because each level block may be further subdivided with some of the child blocks resulting in further subdivision, a shape map identifying which blocks are further subdivided is preferably provided in the data representation of a parent block. In the preferred embodiment, a four bit hexadecimal number is used to identify the child blocks which are further divided. The preferred child block representation scheme is shown in FIG. 12. Most preferably, the "1" values indicate child blocks for which further subdivided blocks generate more efficient codes for representing the domain block; the "0" values indicate that the codes for the current level block are sufficient to accurately represent that block of the video frame data. In the preferred embodiment of the present invention, the RISC processor performs an entropy encoding of the shape map which is included as part of the cost calculations.

FIG. 13 shows an example of a level 0 block for which level 1 and level 2 blocks have been identified as better representing a block in current frame buffer 16. The codes for defining the content of each of these blocks may be organized as shown in FIG. 14A or as shown in FIG. 14B. Other methods for organizing the codewords and still identify the tree structure for the blocks may also be used. What is important is that decompressor 20 be programmed to parse the codewords transmitted to it in the same structure in which they are generated by compressor 12.

The codewords which define the codes for representing a domain block have a format shown in FIG. 15. The color field is a code which indicates whether the Y, U or V component is described by the codeword. Preferably, the codewords for the color components are transmitted in a predetermined order, namely Y followed by U followed by V. Thus, it is not necessary to transmit the color field since the decompressor can determine the color for the next codeword by tracking the codewords transmitted thus far. By eliminating this field, bits are eliminated from the transmission. Likewise, the level field may be eliminated since the compressor transmits the codewords in a predetermined order. The shape field is a bit map which defines which block of the next level has a codeword in the bit stream. Most preferably, a bit value of 1 indicates a codeword follows for that next level block and a bit value of 0 means no codeword follows for the next level block. If the shape field of a Y level 0 codeword indicates that codewords follow for all of the blocks of the next level, there is no value for the X and Y fields for the current level. Here, all four child blocks are going to be replaced so it is unnecessary to provide a representation for the level 0 block. For any level which a codeword representing a motion vector is transmitted, the X and Y value of the motion vector is transmitted in the X and Y fields of the codeword. For level 2 blocks in the Y component and level 1 blocks in the U and V components, the X value is preferably 0 for SVQ blocks and 1 for RVQ blocks, and the Y field is the vector identifier for the corresponding SVQ or RVQ block. Also, for U and V level 0 blocks, the X and Y fields need not be transmitted since they can be calculated from the motion vector for the corresponding Y component domain block. The q field defines a value which is to be added to each pixel of an SVQ or RVQ block or a block from the previous frame to form a block which is moved or added to the regenerated frame buffer. Preferably, if the sum of q and a pixel exceeds the positive or negative boundaries of the pixel data range, the addition is clamped to the boundary value. For example, if the pixel range is +127 − 128, a q value of 64 and a pixel value of 100 results in a sum of 127, the positive value boundary. This value clamping at the boundaries of the pixel data range is also known as saturation clamping. Since q is not computed for the level 0 blocks for all color components and for the level 1 block of the Y component having a motion vector, there is no value to be transmitted in the q field for these blocks. The q value for any VQ block or level 1 Y component block with a no-motion vector is provided in the q field and is preferably expressed as a quantized integer in the range of −252 to +252.

As discussed above, the process includes determining the cost of a codeword and using the cost of codewords within a level to determine the best codeword to represent the block at that level. For example, the cost of the codeword determined by the no-motion search, the codeword determined by the local search, and the codeword determined by the checkerboard search at level 0 for the Y component are compared and the lowest cost is used to select the codeword which represents the domain block at that level. This cost is calculated according to the formula:

$$cost = d \times divisor + length \times \lambda$$

Where d is the distortion measurement, divisor is a fixed constant which preferably is a power of 2 so the multiplication can be implemented with a shift left operation; length is the length in bits of the codeword returned by the entropy encoder; and lambda ($\lambda$) is a LaGrangian multiplier. The $\lambda$ multiplier is updated at the start of the process for each level 0 domain block of the Y component. The $\lambda$ computed for the domain block in the Y component is divided by 4 and used to process the domain blocks of the corresponding U and V components. This regulation of $\lambda$ is preferred since it improves the convergence of the chrominance to the luminance. Prior to the compression of the first frame of a video sequence, the following initial values are set:

target frame size=bit rate÷frame rate;

remaining bits=target frame size;

coefficients [0 . . . (number of domain blocks−1)]=400,000;

total coefficients=400,000×number of domain blocks;

$\lambda$=total coefficients÷target frame size;

The array of coefficients is initialized to 400,000 as an arbitrarily large value which was selected based on empirical performance of the system. Other values of coefficients may be used within the principles of the present invention. Prior to each domain block in the Y component being processed, the following parameters are updated:

block size=number of bits used for the codewords of the previous domain block;

remaining bits=remaining bits−block size;

if (remaining bits ∠1) remaining bits=1;

old coefficient=coefficients [domain block number−1];

coefficients [domain block number−1]=block size×$\lambda$;

total coefficients=total coefficients−old coefficient;

$\lambda$=total coefficients+(((coefficients [domain block number−1]−old coefficient)×(total coefficients÷old coefficient))÷2);

$\lambda$=$\lambda$÷remaining bits;

For all of the domain blocks processed in the frame, $\lambda$ is allowed to change from one block to another by no more than 12.5%, although other limiting factors may be used within the principles of the present invention. This limitation is preferably used as it can be implemented by a shift right by 3 bits operation. For all calculations of $\lambda$, $\lambda$ is preferably restricted to the range of 250 to 60,000 for the preferred divisor of $2^9$, although a larger upper bound of the range is permissible with a larger divisor. This restriction keeps $\lambda$ in a range where a large amount of bits are not expended on the representation of early domain blocks to the detriment of codewords used to represent the domain blocks later processed in the frame and to keep image quality more consistent from frame to frame. In the equations presented above, remaining bits cannot fall below the value of 1 to ensure that there are some bits available for representation of a block, and to avoid dividing by 0.

At the start of each frame, variables size difference and total coefficients are updated as follows:

size difference=size difference+(target frame size−bits_used);

total coefficients=sum (coefficients [0 . . . (number of domain blocks−1)]);

The value for $\lambda$ for the first block of the next frame is the value of $\lambda$ used for the last domain block of the previous frame. The size difference variable indicates when the frame compression is over or under the target bit rate. When the size difference variable is negative, more bits have been spent on codewords than the target size and when it is positive, less bits were spent than the target size. If the size difference variable is negative, the calculations noted above cause the codewords generated for the next frame to be further constrained in a effort to equalize the bit rate from frame to frame. Likewise, if the size difference is positive, the next frame is able to expend more bits than the initial target frame size. The number of bits which may be used for the next frame (remaining bits) corresponds to the overall bit rate and frame rate, plus the over or under amount from previous frames. That is:

remaining bits=target frame size+size difference

Preferably, remaining bits is constrained to be within 25% of target frame size to reduce the likelihood that a frame gets too many or too few bits.

Calculations for the q value, in the preferred implementation, are generally in the range of −255 to +255 because the subtraction of the largest pixel value from the smallest pixel value is −255 and the subtraction of the smallest pixel value from the largest pixel value yields +255. While each possible q value for this entire range may be used, preferably, an approximation of the q value is used. This approximation is a quantized value. While the quantization of the q value is preferably a power of 2, other quantization schemes may be used. Most preferably, the quantized values of q are expressed in increments of 4 within the range of −252 to +252. The relationship between a q value and its quantization may be expressed as:

$$q\_quant = (q \div quant) \times quant$$

When this equation is implemented in a real number system, q_quant is the same as q. However, when the quantization is implemented in an integer system, such as in the preferred implementation of the present invention, a truncation operation takes place. For example, when the quantization factor is 4, i.e., quant=4, and q=6, then q/quant is 1.5 but it is truncated to 1 in the integer implemented scheme. Thus, a quantized value for q=6 is 4. Operations conforming to this equation may be implemented by shifting or masking operations when the quantization factor is a power of 2. Shifting positive q values two places to the right and then two places to the left in the most preferred implementation, results in a quantized value which is less than or equal to the q value and potentially closer to 0. However, shifting a negative number by two places to the right and then two places to the left causes the quantized number to move away from 0 rather than towards it. To compensate for this, the value $2^k-1$ is added to the q value prior to the shift operation. The value k is the exponent of 2 which expresses the quantization factor. In the preferred implementation, the quantization factor is 4 so k=2. Thus, the addition of $2^k-1$ makes negative q values a smaller negative number before being shifted two places to the right and two places to the left to quantize the value.

The main benefit of quantization is that it improves entropy encoding efficiency. However, this efficiency is offset by errors in the accuracy of the representation. In general, statistics for Huffman tables used in the preferred implementation use shorter tokens to represent q values closer to 0. Hence, implementing a quantization method that moves a q value closer to 0 is usually preferred. In some instances, however, a more accurate q value is preferred rather than a shorter token for the q value. That is, a quantized value of q further away from 0 is preferred because the improved accuracy is worth the increased bit cost for the representing token. In the preferred implementation of the present invention, $\lambda$ and a threshold for $\lambda$ are used for rounding control which determine whether a more accurate quantized value or shorter token is preferred for the representation of a q value. In the preferred implementation where the quantization factor is 4, there are four possible rounding positions: 0%, 25%, 50%, and 75%. The 0% position corresponds to a number on a quantization step so its accuracy is not effected by quantization. The 25% position represents those numbers that are one away from the lower quantization value of a pair of adjacent quantization values; the 50% position corresponds to a q value that is two away from both quantization values in the pair, and the 75% position represents a number that is three away from the lowest quantization value and one away from the higher quantization value in a pair. In the preferred implementation, $\lambda$ is compared to a threshold. If it is less than the threshold, then the nearest quantization value is to be used. Otherwise, the one closest to 0 is used. In the preferred implementation, the $\lambda$ threshold is 10,000 for q values computed for Y component domain child (8×8) blocks which are at the 75% position; 10,000 for q values computed for Y component SVQ block comparisons which are at the 50% position; and 10,000 for q values computed for Y component RVQ block comparisons which are at the 75% position. In the preferred implementation, no rounding control is performed on q values for U or V SVQ block comparisons. The threshold and rounding positions were empirically determined but other values may be used.

Lambda is used for cost, as described above, to maintain a constant frame rate so the compressor does not produce more bits for a compressed representation of a frame than can be transmitted within a predefined time for frame transmission. In an alternative mode of operation, $\lambda$ may be used to keep image quality constant while allowing the frame rate to vary. This constant image quality mode is achieved through control of $\lambda$. In a preferred implementation, five quality levels ranging from low to high are used to control $\lambda$. In this preferred implementation, 5 denotes the lowest quality image, 1 denotes the highest quality image and $\lambda$ is restricted to a value ranging from 32,768 to 2,048, respectively. The numeral identifier for the quality level is used to define the clamping value as:

$$\text{clamping\_value} = 1024 \times 2^{level}$$

This value is then used to control $\lambda$ during use in the process described above. Specifically, when $\lambda$ is updated, this clamp-ing value is used instead of the normal value of 60,000. Because the time of transmission of each frame is now variable, a frame transmission time is computed. For example, if the normal frame transmission rate is for 3,000 bits per frame and the constant quality mode permits 6,000 bits to be generated for a frame, then two frame transmission times are required for the transmission of the single compressed frame. If the number of bits generated is less than or equal to the target rate, then the compressor waits for the next predetermined frame time. Preferably, the maximum frame transmission time is limited to three frame transmission times. Any bits remaining to be transmitted after the three frame transmission time are added to an accumulator variable, time difference. If the size of the accumulator significantly impacts the transmission of later frames, the wait time is permitted to increase, preferably, as follows:

```
frame_time = 1000 ÷ frame rate;

wait_time = (frame bitrate × 1000) ÷ target bitrate;

extra_time = wait time − frame_time;

if (extra_time > frame_time × 2)
{
    time difference += extra_time − (frame_time × 2);
    extra_time = frame_time × 2;
}
else if (extra_time < 0) extra_time = 0;

if (time difference > frame_time × 4)
{
    extra_time += time difference − (frame_time × 2);
    time difference = frame_time × 2;
}
wait_time = frame_time + extra_time;
```

In the discussion presented above regarding the processing of the domain blocks, domain child blocks, and domain child sub-blocks, estimated search costs were used to determine whether certain searches for codeword generation were performed. In more detail, the estimated cost for a local search is defined as:

$$\text{estimated\_cost} = \text{typical\_error} \times \text{divisor} + \lambda \times \text{typical\_rate};$$

Thus, in the preferred implementation of the present invention, the estimated cost for a local search is estimated_cost=500,000+$\lambda$×7. The variable typical_error is a typical minimum error for a preferred distortion measurement, namely, an L1 distance. The variable typical_rate is a typical number of bits to represent a non-zero motion vector. Using this value, if the distortion measurement obtained for the no-motion block is less than the estimated_cost as defined above for the preferred implementation, the local search is not performed. A similar estimated cost is used to determine whether a checkerboard search is performed. Preferably, the estimated cost for a checkerboard search is:

$$\text{estimated\_cost} = 1,500,000 + \lambda \times 9;$$

For the domain child blocks, the preferred estimated search cost is:

estimated_cost=80,000+λ×6;

Finally, the preferred estimated cost used to determine whether a residual search is performed is:

estimated_cost=0+λ×5;

These estimated search costs were derived from plots of statistics obtained from compressions performed on frame images. The values were adjusted until the desired frame rate was achieved with minimal impact on the quality of the images regenerated from the compressed representations. The values used above are exemplary only; others are allowed within the principles of the preferred implementation of the present invention.

The SVQ and RVQ blocks stored in the SVQ and RVQ tables of the present invention are used as reference blocks for finding a best correspondence for blocks of a certain size, which in the preferred implementation of the present invention are 4×4 pixel blocks. This size pixel block corresponds to domain child sub-blocks for the Y component and to domain child blocks for the U and V components. The SVQ and RVQ blocks are preferred since the downloading and comparison with these blocks significantly reduces the computational requirements for determining the codes for blocks having the same size as the SVQ and RVQ blocks. Previously known methods for generating a set of vector quantization (VQ) blocks, of which SVQ and RVQ blocks are known types, do not constrain the number of blocks in the generated VQ table to a predetermined number. An important constraint in the control of the VCP of the preferred implementation of the present invention is the size of DM memory 354 which is used for storing an SVQ or RVQ table during a search for a best corresponding block.

In order to optimize SVQ and RVQ tables for the preferred implementation of the present invention, VQ tables were trained. This method is shown in FIG. 16. The first step is to generate a training set of data (block 400). For SVQ tables, this is accomplished by capturing camera input from many different sources to storage media. For the SVQ tables, the video sequences commonly referred to as Mother and Daughter, Trevor, Susie, Carphone, Foreman, Miss America, Salesman, Claire, and Grandma, were used. For RVQ tables, this is accomplished by compressing many video sequences to generate decompressed frames for compression of a current frame and computing residual blocks which are the difference between a block in the uncompressed images and the corresponding block in the decompressed frames. The residual blocks are stored to storage media. Preferably, the residual blocks stored for training are limited to those residual blocks that could have been corrected by the compressor. This is determined, preferably, by comparing the distortion measurement for the portion of the next higher level block corresponding to a domain child sub-block to the product of λ* estimated bit rate. This comparison is used because the higher level distortion measurement is the error in representing the higher level block which is attributable to the domain child sub-block and λ* estimated bit rate represents the cost of representing the domain child sub-block using RVQ with no error. As a result, if λ* estimated bit rate is larger than the portion of the higher level block attributable to the domain child sub-block then the residual of the domain child sub-block would not be used to represent the domain block. Accordingly, the residual block is not stored for training purposes. Preferably, estimated bit rate=4 is used as this is a typical number of bits to represent the vector number and mean for a residual block.

The training process continues by using a Linde-Buzo-Gray/Perturb (LBG/P) trainer to build a large, high bit rate codebook (block 402). The codebook is reduced to the predetermined codebook size by using a Weighted Pairwise-Nearest Neighbor trainer (block 404). A final set of LBG iterations is performed on the small codebook and the resulting codebook is used to compress data and generate statistics for generating Huffman encoding tables for the SVQ table (block 408). For the RVQ table, the compressor with the codebook conforming to the predetermined size is used to generate more residual data as previously described. The training process is then repeated using the new residual data. The elements of the SVQ or RVQ blocks are preferably represented by floating point numbers during training to ensure smooth migration of centroids as discussed in more detail below. The final codebook, however, uses integers which are the result of rounding the floating point numbers to the nearest integer.

To select an optimal set of vectors for a given training set, the training set is segmented into elements. In the preferred implementation the present invention, each element is a predefined sub-block size which, in the preferred implementation in the present invention, is a 4×4 pixel block. Each element of the training set is compared to each vector in an initial codebook. A distortion measurement, which is preferably the L2 distance, is computed between each vector of the codebook and an element in the training set. The element is classified as belonging to the vector which yielded the smallest distortion. By this method, each element of the training set is classified as corresponding to one vector in the initial codebook. Following this classification, a centroid for each training set element corresponding to a particular vector is computed and the computed centroid replaces the codebook vector. This is done for each vector in the codebook. This process continues until the accumulated L2 distances for all of the training set elements minus the total error of the previous iteration drops below a predetermined threshold, which is 1%, in the preferred implementation, of the total error computed for the previous iteration.

In more detail, the centroid for a generated training set is calculated, and used as the vector of the initial codebook. In the preferred implementation, the preferred vector size is 4×4 pixels and the first vector is a 4×4 vector in which each pixel has the mean value of the training set. A Perturb trainer, which is well known in the art, is then used to double the vectors in the codebook. This is done in the preferred implementation by computing a variance vector between each vector in a codebook and each element in the training set corresponding to the vector. The largest component of the variance vector is then multiplied by a predetermined percentage, which is preferably 10%, and added to the corresponding component of the codebook vector to generate pixels for a new codebook vector. This is done for each codebook vector, generating a new codebook vector which is offset by 10% of the largest component of the original vector's variance vector. The LBG/P iterative process continues until a codebook of a predetermined size is reached, which, preferably, is in the range of 1024 to 8192 vectors, although other large codebook sizes may be used depending upon the computing resources available to the user. A large codebook is preferably generated to overcome local minima in the LBG method. In the preferred implementation, the initial codebook has a single vector and the LBG/P process is iteratively performed until the predetermined codebook size is reached.

A weighted pairwise-nearest neighbor (Weighted PNN) trainer is then used to reduce the large codebook. The weight N for a vector V is the number of training set elements correlated to the vector. For each possible pair of vectors, the increase in error caused by the merger of the two vectors is computed. The error increase=$\min(N_A,N_B)*L2(V_A,V_B)$ where A and B denote two vectors, the min operation selects the smaller weight and the selected weight is multiplied by the L2 distance between the corresponding vectors. The A,B vector pair corresponding to the smallest error increase then has the vector with the smaller weight merged into the vector with the larger weight. The larger weight vector remains the same but the weights previously correlated to the smaller vector are now correlated to the larger vector. This is also known as Alphabet-Constrained Weighted PNN training. All pairs are evaluated in the merging process until the predetermined number of vectors is reached. As noted above, the preferred number of vectors is ninety (90) vectors for each of the Y component SVQ and RVQ tables and thirty-two (32) vectors for each of the U and V component SVQ tables. A final LBG process is then performed with the new codebook to correct problems which may have been introduced by the Alphabet-Constrained Weighted PNN training.

In uses where SVQ and RVQ tables must share a common memory area, the tables are reduced to a size which fits within the memory area. However, SVQ and RVQ vectors cannot be merged as the vectors are not functionally interchangeable. To reduce an SVQ table and an RVQ table so both fit within a finite sized memory, each vector table is generated as discussed above. The tables are then used in a compressor to generate weights for the vectors. Then the weights are used for a joint Alphabet-Constrained Weighted PNN trainer to reduce the size of both tables so they fit in a memory the size of a single table. This is done by determining the smallest error increase for each vector pair in each table and then merging the SVQ or RVQ vector pair that has the smallest error increase. The process continues, selecting either an SVQ or RVQ pair until the combined total of the two tables equals the size of a single table. Each resulting SVQ and RVQ table is then used in an LBG process to correct for problems which may have been introduced by the Alphabet-Constrained Weighted PNN training process. Then the combined tables are used in a compressor to develop more weights for the vectors. The LBG/Perturb process discussed above is then used to increase each table to the size of the memory, for example, 90 vectors. The Alphabet-Constrained Weighted PNN trainer is then used to reduce both tables so they fit in the memory and an LBG process is performed to correct for problems which may have been introduced. After each iteration, the quality is evaluated to determine whether the process is improving the vector tables. This process may be used independently on an SVQ table or an RVQ table to reduce either table to a predetermined size.

Between frames, the compressor of the present invention may be placed in a half-frame mode of operation. The compressor remains in this mode until it is changed to full frame operation. If the compressor is placed in half-frame mode, the decompressor must be placed in the same mode. Otherwise, the decompressor does not accurately decompress codewords. This technique decreases the size of the frames that are compressed to permit a higher frame rate. In the preferred implementation, this process is performed for the Y component by removing alternating rows of pixels from the current frame buffer 16 and applying a 3-tap Low-Pass filter to reduce aliasing, as is well known to those skilled in the art, yielding a 176×72 frame. This is then reduced to 176×64 by removing the last 8 rows of pixels from the downsampled frame. The preferred coefficients for the 3-tap Low-Pass filter are: C1=7, C2=114, C3=7. The divisor preferably used is 128 since it is the sum of the coefficients and is a power of 2. The U and V components of the downsampled frame may be obtained by the same process, except that only the last 4 rows of pixels are removed from the downsampled U and V components. Alternatively, a 5-tap filter, row averaging, or some other method can be used to generate the downsampled frame.

The downsampled frame is then compressed in accordance with the process described above with respect to FIGS. 6, 7, 9, 10, 11, 21 and 20. Use of the domain block sizes noted above on the downsampled frame size reduces the compression time per frame by more than half and accordingly, the achievable frame rate is doubled. At the decompressor, the regenerated frame is 176 by 64 pixels and is vertically increased by a factor of 2 using line doubling, filtering in the DCT compressor of the preferred embodiment or some other scaling technique to generate the expected size for the display. While the filtering performed in the half-frame mode reduces image quality, it permits significantly higher frame rates.

The process for decompression of the codewords to regenerate an image is shown in FIG. 17. The process begins by receiving codewords for a domain block from compressor 12 (block 300). These codewords are unpacked using a Huffman decoder to recover the codes (block 304). A block, either in the regenerated frame buffer or an SVQ or RVQ table, is identified by the codes. The vector identifier or motion vector for the identified block is used to move pixels from the identified SVQ or RVQ block or regenerated frame buffer block into a current frame buffer (block 306). If pixel elements for an SVQ block or a level 1 block for a Y component without a motion vector are being moved, the pixel values are adjusted by the q parameter prior to moving the pixel elements into the current frame buffer, preferably with reference to saturation clamping for calculation of pixel values. If pixel elements for an RVQ block are being used, the pixel values are adjusted by the q parameter and added to the block in the current frame buffer with saturation clamping. After all the codewords for all of the domain blocks have been processed (block 308), the current frame buffer contains the pixel elements of the regenerated frame. This frame may then be provided to an output for display (block 310) or storage and the contents of the current frame buffer used to update the regenerated frame buffer (block 312).

The compression method of the present invention requires a decompressor to have a frame regenerated from a previously compressed representation in order to perform decompression as subsequent frames are compressed with reference to a previously regenerated frame. This requirement is compatible with point-to-point communications where communication between a compressor and a remote decompressor are synchronized. In some applications, however, communication between a compressor and remote decompressor are not synchronized. For example, in a video broadcast, a decompressor may begin receiving compressed representations of frames after one or more frames of the frame stream have been compressed and transmitted. In order to provide synchronization for such a system, synchronization or key frames are periodically transmitted in the frame stream. A key frame is a frame that is compressed without reference to a previous frame in the stream, i.e., the compression is made only with reference to the frame itself. As a result, the remote decompressor decompresses the compressed representation of a key frame to establish a first frame from which subsequent frames may be decompressed.

A commonly used method for compressing key frames with DCT methods such as that specified by the H.263 standard may be used. The DCT processor used in the preferred embodiment of the present invention uses a method performed similar to the H.263 standard for generating key frames. In a preferred implementation of the present invention, a key frame is generated upon the occurrence of one of three events: (1) a maximum time interval has elapsed, (2) a scene change is detected, or (3) an external source requests a key frame. Preferably, the maximum time interval is in the range of 10–30 seconds. There is, preferably, also a minimum interval which prevents key frames from being inserted too often, and that range is typically 1–5 seconds.

Scene change detection in the preferred implementation is performed by comparing a change in cost to a threshold value. The change in cost is the sum of the non-do-nothing costs of the domain blocks already processed in the current frame minus the sum of the non-do-nothing costs for the corresponding domain blocks in the previous frame. Preferably, this comparison is performed when the first one-quarter of the frame has been compressed. If a scene change is detected at that time, the current compression method is terminated and a key frame is generated. The preferred threshold for comparing the cost to detect a scene change is 15,000,000 for the constant frame rate mode and 7,500,000 for the constant quality mode. For half-frame processing, the preferred threshold is 7,500,000.

The DCTs used by the key frame method of the preferred implementation operate on blocks of pixels of size 8 by 8 and consist of a single "DC" coefficient and 63 "AC" coefficients, as well understood by those skilled in the art. Encoding of the DCT is made more efficient through quantization of the AC coefficients which is achieved by dividing each coefficient by a value which is preferably two times an AC coefficient quantization parameter. In the preferred implementation, the AC coefficient quantization parameter is determined by evaluating SVQ vector usage during compression of Y domain blocks. In the preferred implementation, the vectors comprising the SVQ vector table are classified as being one of low detail, medium detail, or high detail. For the ninety vectors of the preferred implementation, vector 0 is classified as a low detail block, vectors 1–7 are classified as medium detail blocks, and vectors 8–89 are classified as high detail blocks. The number of occurrences that each type of vector is selected to represent a domain child sub-block is accumulated. The accumulated number of times each type of SVQ block is selected is divided by the total number of SVQ blocks selected to determine a percent of utilization for each type. The symbols "Low %", "Medium %" and "High %" in the following table denote the calculated percentages for the low, medium and high detail block types. The table also depicts the conditions which are used to classify a frame or frame portion as very low detail, low detail, medium detail, high detail, and very high detail and a corresponding quantization parameter provided to the VP processor for generating the key frame. The quality of the key frame is better for low QP values; however, the number of bits required for the representation are higher while lower quality and smaller bit amounts for key frames are obtained for higher QP values. Thus, high detailed frames use higher QP values in an effort to keep the bit rates within the frame transmission times that are acceptable in the preferred implementation.

| SVQ STATISTICS | CLASSIFICATION | QUANTIZATION PARAMETER |
| --- | --- | --- |
| Low% >= 50% | Very Low Detail | 8 |
| Low% > Medium%&Low% > High% | Low Detail | 15 |
| Medium% > Low%&Medium% > High% | Medium Detail | 18 |
| High% > Low%&High% > Medium% | High Detail | 21 |
| High% >= 50% | Very High Detail | 27 |

The quantization parameters in the table above are designed to target a rate of about 9000 bits per frame. In order to target other rates, the following equation can be used:

$$QP_{target} = QP_{9k} + ((9000 - \text{target rate}) \times 2) \div 1024;$$

While the above approach approximates the amount of detail in an image being compressed, it does not take into account the actual amount of error measured in using the SVQ blocks. In an effort to evaluate the amount of error, as well as the type of SVQ block being used, the most preferred method of the present invention uses a threshold which is compared to the distortion measurement generated during an SVQ block comparison. If the distortion measurement is greater than the threshold, the accumulated count for an SVQ block type other than the type corresponding to the SVQ block is incremented. In the most preferred implementation, the type of SVQ block type count that is incremented is the high detail type. Thus, the most preferred implementation increments the high detail count if the distortion measurement exceeds the threshold, otherwise the type of block corresponding to the SVQ vector used is incremented. This may be expressed as:

```
if (vector == 0)
{
    If (error < 55)
    {
        lowCount++;
    }
    else
    {
        highCount++
    }
}
else if (vector < 8)
{
    if (error < 70)
    {
        mediumCount++
    }
```

```
        else
        {
            highCount++
        }
    }
    else
    {
        highCount++
    }
}
```

The accumulated counts using this logic are then used to compute the Low %, Medium %, and High % percentages and the classifications are made in accordance with the table presented above.

In use, the system 10' is installed at a site for compressing a sequence of related data sets. At a site where the related data sets are video frames of a video sequence, operation of the compressor begins by setting all of the pixel elements of the previous frame buffer to a gray value, which is preferably the middle of the pixel value range. The frame rate, bit rate and half-frame mode parameters for the video sequence generator are known and those values are used to initialize the parameters associated with the bit rate calculations discussed above. As video frames are generated by the video generator, they may be preprocessed by components outside the DCT processor or, as in the preferred embodiment, components onboard the DCT processor may be used to filter and preprocess the frames prior to placing them in the current frame buffer. The first frame placed in the current frame buffer may be compressed as a key frame and sent to the decompressor. Subsequent non-key frames are placed in the current frame buffer and compressor 12 initiates compression of the Y component of the frame by selecting a first domain block from the Y component and performing the level 0, 1, and 2 searches according to the process set forth above. The corresponding blocks in the U and V components are then preferably processed and then a do-nothing code is evaluated. The selected do-nothing code or Y, U and V component codes are entropy encoded and transmitted to a remote site. The codes selected for the domain block are also used to generate a decompressed image which is stored in the target buffer. Preferably, the entropy encoder is a Huffman encoder implemented in the program memory of the process controller. The process continues compressing the frame by compressing the domain blocks in the order of Y, U, and V components. After a frame is compressed, the target buffer and the previous frame buffer are updated as previously described.

At the remote site, the regenerated frame buffer of the decompressor is initialized to a gray scale value. Thereafter, the receiver receives encoded codewords and provides them to the decompressor. The decompressor decodes the codewords to generate the codes which are then used to move and adjust pixel elements from the regenerated frame buffer or the VQ tables to generate a current frame. The current frame may then be output for use at the remote site and this regenerated frame loaded into the regenerated frame buffer for use to decompress the next frame. The remote decompressor is also able to decompress key frames as they appear in the bit stream.

At any time between frames during the compressor operation, a signal may be generated which places the compressor and decompressor into a half-frame operation mode. In this mode, the current frame is interpolated into an interpolated QCIF frame size and the previous frame buffer is initialized to the gray scale value. Likewise, the decompressor initializes its regenerated frame buffer to the initial gray value. Thereafter, the compressor compresses the interpolated QCIF frames according to the process set forth above and the decompressor operates to decompress the codewords into interpolated QCIF size frames. These frames are then vertically scaled to the 176×128 frame size for display. The decompressor uses the downsampled QCIF size (176×64) frame as its reconstructed frame.

While the present invention has been illustrated by a description of preferred and alternative embodiments and processes, and while the preferred and alternative embodiments processes have been described in considerable detail, it is not the intention of the applicants to restrict or in any way limit the scope of the appended claims to such detail. Additional advantages and modifications will readily appear to those skilled in the art.

What is claimed is:

1. A method of selecting compression codes for related sets of data comprising, the steps of:

determining an initial codeword that represents a domain block of a current frame buffer in reference to a selected range block in a previous frame buffer, the selected range block being identified by a best measurement determined from an initial type of search performed on a first group of range blocks in said previous frame buffer;

generating an initial codeword cost for coding said initial codeword;

determining a first estimated cost of a codeword representing said domain block in reference to a second range block in said previous frame buffer, said second range block being identified by an estimated best measurement determined for a second type of search performed on a second group of range blocks in said second previous frame buffer;

comparing said first estimated cost to initial codeword cost;

performing said second type of search in response to said first estimated cost being less than said initial codeword cost;

generating a second codeword that represents the domain block in reference to a second range block corresponding to an actual best measurement determined by said second type of search;

determining the cost of coding the second codeword; and selecting from said initial codeword and said second codeword the codeword having the least cost.

2. The method of claim 1 further comprising the steps of:

determining a second estimated cost of a codeword representing said domain block in reference to a third range block in said previous frame buffer, said third range block being identified by an estimated best measurement determined for a third type of search performed on range blocks in said previous frame buffer;

performing said third type of search in response to said second estimated cost being less than said cost of said selected codeword;

generating a third codeword that represents the domain block in reference to a range block corresponding to an actual best measurement determined by said third type of search;

determining the cost of coding the third codeword; and selecting from said initial codeword, said second codeword and said third codeword, the codeword having the least cost.

3. The method of claim 2 wherein said step of executing said initial type of search comprises executing a no motion search of range blocks in said previous frame buffer.

4. The method of claim 3 wherein said step of executing said second type of search comprises executing a local search of range blocks of said previous frame buffer.

5. The method of claim 4 wherein said step of executing said third type of search comprises executing a checkerboard search of range blocks in said previous frame buffer.

6. The method of claim 5 wherein said steps of determining the cost each comprise using a sum of a product of a distortion measurement and a normalization factor and a product of a length of a codeword and a bit rate multiplier, said distortion measurement representing the distortion between the domain block and the block identified by the type of search executed.

7. The method of claim 2 further comprising the steps of:

segmenting said domain block into domain child blocks;

computing the difference between each pixel of a domain child block and each pixel of a range child block of the previous frame buffer corresponding to said selected least cost codeword;

summing the absolute value of the differences determined in said step of computing the difference, thereby producing a domain child block error for each domain child block;

determining a third estimated cost of a codeword representing each domain child block in reference to a range child block in said previous frame buffer that may be identified by an estimated best measurement determined for a fourth type of search performed on range child blocks in said previous frame buffer;

if said third estimated cost for a domain child block being evaluated is less than said domain child block error for the domain child block being evaluated, executing said fourth type of search for the domain child block being evaluated and determining a best correspondence for said domain child block being evaluated and the range child block identified by the fourth type of search.

8. The method of claim 7 further comprising the steps of:

generating a fourth codeword that represents the domain block in reference to a range block corresponding to an actual best measurement determined by said fourth type of search;

determining the cost of coding the fourth codeword; and selecting from said codewords, the codeword having the least cost.

9. The method of claim 8 further comprising the steps of:

computing the difference between each pixel of a domain child block and each pixel of a corresponding range block of the previous frame buffer;

computing the mean of said pixel differences for each said domain child block;

subtracting said mean from each pixel of said domain child block, thereby yielding a mean-stripped pixel difference block;

generating a codeword for each mean-stripped pixel difference block;

determining the cost of coding each mean-stripped pixel difference block;

comparing the cost of a set of codes for each mean-stripped pixel difference block and a cost of a set of codes for said best correspondence for said domain child block;

selecting one of said sets of codes to represent said domain child block that corresponds to said least cost.

10. The method of claim 9 further comprising the steps of:

segmenting said domain child block into domain child sub-blocks;

computing the difference between each pixel of a domain child sub-block and each pixel of a range child sub-block of the previous frame buffer corresponding to said selected least cost codeword;

summing the absolute value of the differences determined in said step of computing the difference, thereby producing a domain child sub-block error for each domain child sub-block;

calculate the mean pixel value for each said domain child sub-block;

adjusting said domain child sub-block by subtracting said mean pixel value from each said domain child sub-block;

comparing said adjusted domain child sub-block to a plurality of SVQ blocks;

selecting codes for said domain child sub-block corresponding to an adjusted domain child sub-block/SVQ block combination having a smallest distortion measurement; and computing a SVQ cost for said codes for said domain child sub-block corresponding to an adjusted domain child sub-block/SVQ block combination having a smallest distortion measurement.

11. The method of claim 10 further comprising the steps of:

computing an estimated residual search cost for representing each domain child sub-block in terms of a range block located by a residual search;

comparing the estimated residual search cost to the domain child sub-block error for the evaluated domain child sub-block; and executing a residual search in a previous frame buffer if the estimated residual search cost is less than the domain child sub-block error.

12. The method of claim 11 wherein said residual search further comprises:

subtracting each domain child sub-block from a range child sub-block corresponding to a codeword representing a least cost, thereby forming a difference block;

computing the mean pixel value for the difference block;

subtracting said mean pixel value for the difference block from each pixel value of the difference block, thereby yielding a mean-stripped difference block.

13. The method of claim 12 further comprising the steps of:

computing a distortion measurement between the mean-stripped difference block and each residual vector block in a residual vector quantization (RVQ) table;

selecting codes for said domain child sub-block corresponding to a mean-stripped difference block/RVQ block combination having a smallest distortion measurement; and computing a RVQ cost for said codes for said domain child sub-block corresponding to a mean-stripped difference block/RVQ block combination.

14. The method of claim 13 further comprising the step of selecting the codeword that has the lower cost between the RVQ codeword and the SVQ codeword.

15. The method of claim 14 further comprising the steps of:

in response to the selected RVQ codeword or selected SVQ codeword having a cost lower than said domain child sub-block error, adding the codeword for the domain child sub-block to the set of codes which represent the domain child block; and adjusting the cost of the codeword for the domain child-block to reflect the inclusion of the domain child sub-block codeword.

16. The method of claim 15 further comprising the step of replacing the set of codes which represent the domain child block by a minimum length codeword if all of the codewords for the domain child sub-blocks are selected and are all SVQ codes.

17. The method of claim 16 further comprising the steps of:

in response to the cost of the set of codes determined for each domain child block or the cost of the minimum length codeword for each domain child block being less than the domain child block error,
retaining the codewords for the domain child blocks and the domain child sub-blocks to represent the domain blocks, and
adjusting the domain block cost to reflect the retention of the codewords for the domain child blocks and the domain child sub-blocks; and in response to the cost of the set of codes determined for each domain child block or the cost of the minimum length codeword for each domain child block being more than the domain child block error, removing the codewords for the domain child blocks and the domain child sub-blocks from the set of codes which represent the domain block.

18. The method of claim 17 further comprising the step of removing the codeword for the domain block from the set of codes which represent the domain block if all the codewords for the domain child blocks are retained.

19. The method of claim 18 further comprising the steps of:

evaluating a second color component corresponding to the domain block;

determining a motion vector for a best correspondence between the Y component of the domain block in a current frame buffer and a range block in a previous frame buffer;

computing a distortion measurement between a second color component domain block and the corresponding no-motion block in the previous frame buffer;

adjusting the motion vector determined for the best correspondence for the Y component of the domain block and range block to reflect the smaller size of the second color component;

computing a second distortion measurement between the second color component domain block and the range block corresponding to the adjusted motion vector;

in response to said second distortion measurement exceeding a predetermined threshold;

segmenting the second color component domain block into a plurality of second color component domain child blocks;

determining a second color component domain-child distortion measurement between a second color component domain child block in said current frame buffer and a corresponding range block in a previous frame buffer;

comparing said second color component domain-child distortion measurement to a second threshold;

in response to the second color component domain-child distortion measurement being greater than said second threshold:
computing the mean pixel value for each second color component domain child block, and
subtracting the mean pixel value from each second color component domain child block, thereby yielding a mean-stripped domain child block,
computing a distortion measurement between the mean-stripped domain child block and each block in a vector quantization (SVQ) table,
selecting codes for said second color component domain child block corresponding to a mean-stripped domain child block/SVQ block combination having a smallest distortion measurement, and
computing an SVQ cost for said codes for said second color component domain child block corresponding to a mean-stripped domain child sub-block/SVQ block combination;

in response to the SVQ cost being less than the distortion measurement for the portion of the domain block which corresponds to the second color component domain child block, including the set of codes in the codes for representing the domain block.

20. The method of claim 19 further comprising the steps of:

in response to the set of codes selected for representing the domain blocks and child domain blocks having a greater cost than the cost of a do-nothing code representation of the domain block, selecting the do-nothing code to represent said domain block.

* * * * *